(12) United States Patent
Tripathi et al.

(10) Patent No.: US 11,696,205 B2
(45) Date of Patent: Jul. 4, 2023

(54) CONTEXT-SPECIFIC CUSTOMIZATION OF HANDOVER PARAMETERS USING CHARACTERIZATION OF A DEVICE'S RADIO ENVIRONMENT

(71) Applicant: Samsung Electronics Co., Ltd., Suwon-si (KR)

(72) Inventors: Nishith D. Tripathi, Parker, TX (US); Hao Chen, Allen, TX (US); Jianhua Mo, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 98 days.

(21) Appl. No.: 17/031,622

(22) Filed: Sep. 24, 2020

(65) Prior Publication Data

US 2021/0099942 A1  Apr. 1, 2021

Related U.S. Application Data

(60) Provisional application No. 62/909,376, filed on Oct. 2, 2019, provisional application No. 62/906,498, filed on Sep. 26, 2019.

(51) Int. Cl.
*H04W 36/32* (2009.01)
*H04W 36/00* (2009.01)
(Continued)

(52) U.S. Cl.
CPC ....... *H04W 36/32* (2013.01); *H04W 36/0033* (2013.01); *H04W 36/0058* (2018.08);
(Continued)

(58) Field of Classification Search
CPC ............. H04W 36/32; H04W 36/0033; H04W 36/0058; H04W 36/00837; H04W 74/0833; H04W 36/0083; H04W 36/36
See application file for complete search history.

(56) References Cited

U.S. PATENT DOCUMENTS

2013/0244664 A1  9/2013 Song et al.
2014/0194109 A1* 7/2014 Nunzi ................... H04W 24/08
455/418
(Continued)

FOREIGN PATENT DOCUMENTS

KR  10-2015-0005421 A  1/2015
WO  2018156696 A1  8/2018

OTHER PUBLICATIONS

3GPP TR 22.872 V16.0.0 (Jun. 2018), Technical Report, 3rd Generation Partnership Project; Technical Specification Group Services and System Aspects; Study on positioning use cases; Stage 1 (Release 16), Jun. 2018, 74 pages.
(Continued)

*Primary Examiner* — Nam T Huynh

(57) ABSTRACT

A method for managing mobility in a wireless communication system includes determining an initial mobility management configuration for a user equipment (UE) in a serving cell based on cell configuration information. The method also includes identifying a current context of the UE based on reports received from the UE. The method further includes determining an updated mobility management configuration for the UE based on the current context of the UE. Additionally, the method includes transmitting a configuration message to update the UE with the updated mobility management configuration. The method also includes determining whether to trigger a handover of the UE based on comparison of the serving cell and neighbor cell measurements with thresholds. The method further includes triggering the handover based on the updated mobility management configuration.

20 Claims, 15 Drawing Sheets

(51) Int. Cl.
H04W 74/08 (2009.01)
H04W 36/36 (2009.01)

(52) U.S. Cl.
CPC .. *H04W 36/0083* (2013.01); *H04W 36/00837* (2018.08); *H04W 36/36* (2013.01); *H04W 74/0833* (2013.01)

(56) References Cited

U.S. PATENT DOCUMENTS

| | | | |
|---|---|---|---|
| 2015/0016412 A1 | 1/2015 | Horn et al. | |
| 2015/0181481 A1 | 6/2015 | Masini et al. | |
| 2016/0219473 A1 | 7/2016 | Teyeb et al. | |
| 2016/0242059 A1 | 8/2016 | Lopes et al. | |
| 2016/0345222 A1* | 11/2016 | Axmon | H04W 36/04 |
| 2019/0238202 A1 | 8/2019 | Chavva et al. | |
| 2020/0145977 A1* | 5/2020 | Kumar | H04L 5/0048 |
| 2021/0051557 A1* | 2/2021 | Abedini | H04W 56/001 |
| 2021/0076271 A1* | 3/2021 | Jokela | H04W 36/36 |

OTHER PUBLICATIONS

International Search Report of the International Searching Authority dated Dec. 30, 2020 in connection with International Application No. PCT/KR2020/013225, 3 pages.

ZTE, "Consideration on support CAG in NR," R3-190262, 3GPP TSG-RAN WG3 #103, Athens, Greece, Feb. 25-Mar. 1, 2019, 4 pages.

Extended European Search Report dated Aug. 19, 2022 regarding Application No. 20866985.3, 8 pages.

\* cited by examiner

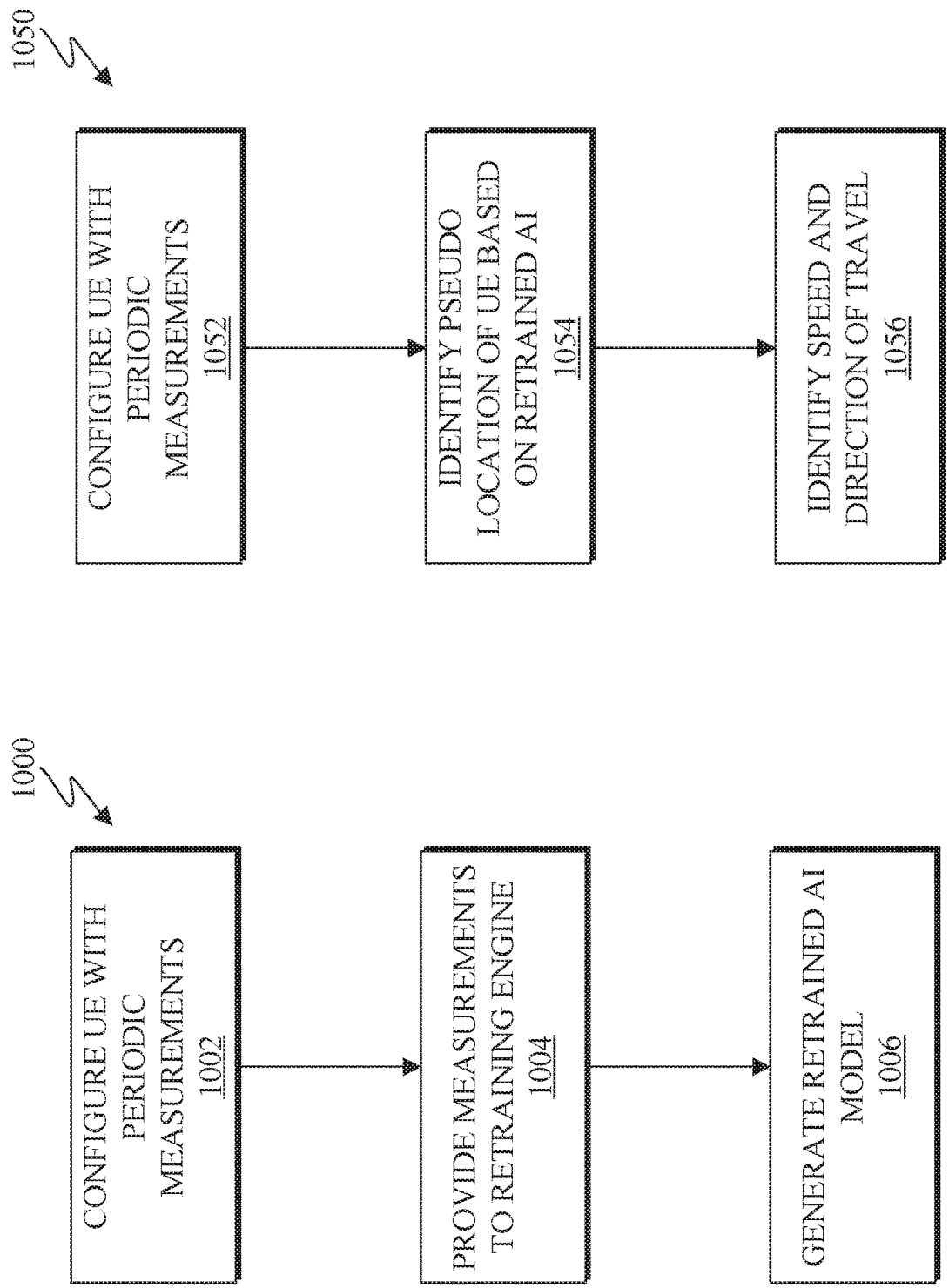

| Key parameters | Low Speed | | Medium Speed | | Fast Speed | |
|---|---|---|---|---|---|---|
| | VoLTE/Gaming | Data/FTP | VoLTE/Gaming | Data/FTP | VoLTE/Gaming | Data/FTP |
| TTT | TTT1 | TTT2 | TTT3 | TTT4 | TTT5 | TTT6 |
| A3-threshold | A3_1 | A3_2 | A3_3 | A3_4 | A3_5 | A3_6 |
| Measurement Report period | P1 | P2 | P3 | P4 | P5 | P6 |

| Key parameters | Low Speed | | Medium Speed | | Fast Speed | |
|---|---|---|---|---|---|---|
| | VoLTE/Gaming | Data/FTP | VoLTE/Gaming | Data/FTP | VoLTE/Gaming | Data/FTP |
| TTT | 256ms | 512ms | 128ms | 256ms | 40ms | 128ms |
| A3-threshold | 6 | 12 | 4 | 6 | 3 | 4 |
| Measurement Report period | 50ms | 100ms | 25ms | 50ms | 10ms | 25ms |

FIG. 11D

CONTEXT-SPECIFIC CUSTOMIZATION OF HANDOVER PARAMETERS USING CHARACTERIZATION OF A DEVICE'S RADIO ENVIRONMENT

CROSS-REFERENCE TO RELATED APPLICATION AND CLAIM OF PRIORITY

This application claims priority under 35 U.S.C. § 119(e) to U.S. Provisional Patent Application No. 62/906,498 filed on Sep. 26, 2019 and U.S. Provisional Patent Application No. 62/909,376 filed on Oct. 2, 2019. The above-identified provisional patent applications are hereby incorporated by reference in their entirety.

TECHNICAL FIELD

The present disclosure relates to a pre-5$^{th}$-Generation (5G) or 5G communication system for supporting higher data rates in 4$^{th}$-Generation (4G) communication system such as Long-Term Evolution (LTE) and beyond 4G system. More particularly, the present disclosure is directed to customizing mobility management configurations.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 24 GHz and above such as 28 GHz, 39 GHz, and 60 GHz bands, so as to accomplish higher data rates or in lower frequency bands such as below 6 or 7 GHz to enable robust coverage. To decrease propagation loss of the radio waves and increase the transmission distance, the beamforming, massive multiple-input multiple-output (MIMO), Full Dimensional MIMO (FD-MIMO), array antenna, an analog beam forming, and large scale antenna techniques are discussed and designed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

A communication system includes a DownLink (DL) that conveys signals from transmission points such as Base Stations (BSs) or eNodeBs to User Equipments (UEs) and an UpLink (UL) that conveys signals from UEs to reception points such as eNodeBs. A UE, also commonly referred to as a terminal or a mobile station, may be fixed or mobile and may be a cellular phone, a personal computer device, etc. An eNodeB, which is generally a fixed station, may also be referred to as an access point or other equivalent terminology.

SUMMARY

This disclosure provides context specific customization of handover parameters using dynamic characterization of the device's radio environment.

In one embodiment, a network entity for managing mobility in a wireless communication system is provided. The network entity includes a transceiver and a processor. The processor operably coupled to the transceiver. The processor is configured to determine an initial mobility management configuration for a user equipment (UE) in a serving cell based on cell configuration information. The processor is configured identify a current context of the UE based on reports received from the UE. The processor is configured determine an updated mobility management configuration for the UE based on the current context of the UE. The processor is configured transmit a configuration message to update the UE with the updated mobility management configuration. The processor is configured determine whether to trigger a handover of the UE based on comparison of the serving cell and neighbor cell measurements with thresholds. The processor is configured trigger the handover based on the updated mobility management configuration.

In another embodiment, a method for managing mobility in a wireless communication system is provided. The method includes determining an initial mobility management configuration for a UE in a serving cell based on cell configuration information. The method includes identifying a current context of the UE based on reports received from the UE. The method includes determining an updated mobility management configuration for the UE based on the current context of the UE. The method includes transmitting a configuration message to update the UE with the updated mobility management configuration. The method includes determining whether to trigger a handover of the UE based on comparison of the serving cell and neighbor cell measurements with thresholds. The method includes triggering the handover based on the updated mobility management configuration.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIGS. 10A and 10B illustrate flowcharts for updating the location of the UE according to various embodiments of this disclosure;

FIGS. 11A, 11B, 11C, and 11D illustrate example diagrams and tables for triggering a handover based on UE context according to various embodiments of this disclosure.

DETAILED DESCRIPTION

Figure 1:
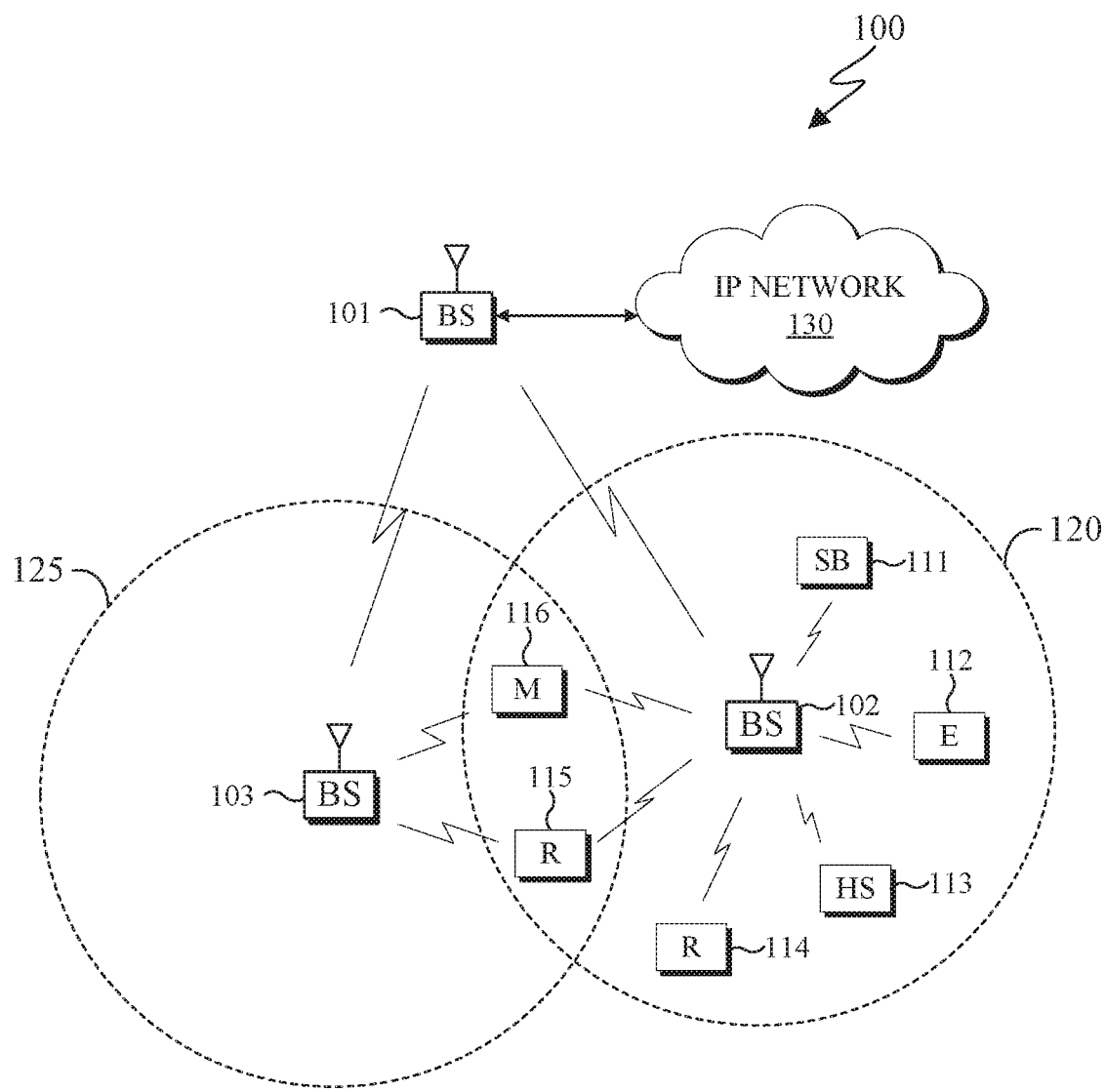
FIG. 1 illustrates an example wireless network within an exemplary networked computing system according to various embodiments of this disclosure.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably-arranged wireless communication system.

Mobility management configurations such as the list of cells to be monitored (so-called "white list"), handover measurement events, thresholds, hysteresis values, and timers can be set to the same values for different UEs in a cell. Such generic parameter setting restricts the achievable performance during handover. For example, the UE may stay for a longer time with the serving cell under poor radio channel conditions, resulting in lower throughput, degraded voice quality, and/or overall degradation in service experience. Furthermore, for fast-moving UEs, handover may not be made fast enough, resulting in the drop of the radio connection and longer service interruption. Additionally, handover may be made to an incorrect or "less optimal" cell, leading to a connection drop or relatively lower service experience.

According to embodiments of the present disclosure, mobility management configurations for a UE are customized based on the context for that UE. In certain embodiments, the context of a UE is characterized by parameters such as the UE's absolute or pseudo location, a traveling speed (such as miles per hour) of the UE, and direction of travel (such as east and north-east) of the UE and the like. The context of a UE can also include a Quality of Service metric. The mobility profile of a UE includes the actual speed of the UE or speed categories such as low-speed, medium-speed, and high-speed. The context of a UE may also include the network (e.g., LTE and its variants including LTE-Machine type communications (LTE-M)), Narrowband Internet of Things (NB-IoT) and 5G), and spectrum capabilities of the UE (e.g., sub-7 GHz and mmW bands). The context parameters are combined in a suitable manner to customize handover related parameters for the device. Customization of handover parameters based on the context characterization for a UE at a given instant results in faster and more reliable handover. The customized handover can minimize any service interruption as well as increase performance and service experience as compared to a case when such customization is absent.

Embodiment of the present disclosure provide systems and methods to identify a location of the UEs even without a location signal such as from a global positioning system (GPS). For example, a network entity can estimate the UE's absolute or pseudo-location (a location that is relative to the cell), speed of the UE, and the direction in which the UE traveling. Such characterization of the UE's context can be used to use one set of handover parameter values for one UE and a different set of handover parameter values for another UE at a given instant. Furthermore, for a given UE, one set of handover parameter values can be used at one instant, and a different set of handover parameter values can be used at another instant.

Additionally, since mobility is inherent in a cellular network and different services have different Quality of Service (QoS) requirements, handover optimization is an important component to maintain or exceed target service performance in the challenging radio environment.

Embodiments of the present disclosure take into consideration that for a given cell, handovers parameters are generally the same for each UE. As such, the UEs in a cell can use the same handover parameters. Using common setting of handover or mobility management configurations result in sub-optimal performance and service experience in the handover region. As such, a UE can experience a slow handover, a sub-optimal handover, or degraded performance, or a combination thereof.

For example, a UE can experience a slow handover and degraded performance, since a UE could stay connected to a weaker serving cell for a relatively longer time (due to larger hysteresis or time-to-trigger values), resulting in lower-than achievable performance. For instance, a UE, in an implementation-specific manner, can inspect different types of cells with different priority. If no white list is given to the UE or a long white list is given to a UE, it can delay detection of a strong neighbor, resulting in a slower handover. White-listed cells are cells that are searched more frequently, and non-white-listed cells are cells that are searched less frequently.

For another example, a UE can experience a sub-optimal handover and degraded performance. In the absence of an optimal white list, handover may be made to an incorrect or less optimal neighboring cell due to the dynamic nature of the propagation environment. The white list that reflects the individual UE context has the white list that reflects the appropriate set of candidate handover targets.

Therefore, embodiments of the present disclosure provide system and methods for determining mobility management configurations per UE based on the UE's current context. Embodiments of the present disclosure provide system and methods for customizing handover parameters for a UE such that a handover, when triggered, reflects the UE's specific circumstances. For example, for a UE in the South-East portion of a cell, one white list can be used, and, for a UE in the South-West portion of a cell, a different white list can be used. In another example, for a slow-moving UE, one set of (hysteresis, threshold, time-to-trigger) values can be used and a different set of (hysteresis, threshold, time-to-trigger) values can be selected for a fast-moving vehicle.

FIG. 1 illustrates an example wireless network 100 within an exemplary networked computing system according to various embodiments of this disclosure. The embodiment of the wireless network 100 shown in FIG. 1 is for illustration only. Other embodiments of the wireless network 100 could be used without departing from the scope of this disclosure.

Depending on the network type, the term network entity, such as a base station (BS) can refer to any component (or collection of components) configured to provide wireless access to a network. A BS can include as transmit point (TP), transmit-receive point (TRP), an enhanced base station (eNodeB or eNB or gNB), a macrocell, a femtocell, a WiFi access point (AP), or other wirelessly enabled devices. Base stations may provide wireless access in accordance with one or more wireless communication protocols, e.g., 5G 3GPP New Radio Interface/Access (NR), long term evolution (LTE), LTE advanced (LTE-A), High Speed Packet Access (HSPA), Wi-Fi 802.11a/b/g/n/ac, etc. For the sake of convenience, the terms "BS" and "TRP" are used interchangeably in this patent document to refer to network infrastructure components that provide wireless access to remote terminals. Also, depending on the network type, the term "user equipment" or "UE" can refer to any component such as "mobile station," "subscriber station," "remote terminal," "wireless terminal," "receive point," "an IoT device," or "user device." For the sake of convenience, the terms "user equipment" and "UE" are used in this patent document to refer to remote wireless equipment that wirelessly accesses a BS, whether the UE is a mobile device (such as a mobile telephone or smartphone) or is normally considered a stationary device (such as a desktop computer or vending machine).

The wireless network 100 includes an eNodeB (such as a BS) BS 101, an BS 102, and an BS 103. The BS 101 communicates with the BS 102 and the BS 103. The BS 101 also communicates with at least one Internet Protocol (IP) network 130, such as the Internet, a proprietary IP network, or other data network.

The BS 102 provides wireless broadband access to the network 130 for a first plurality of user equipment's (UEs) within a coverage area 120 of the BS 102. The first plurality of UEs includes a UE 111, which may be located in a small business (SB); a UE 112, which may be located in an enterprise (E); a UE 113, which may be located in a WiFi hotspot (HS); a UE 114, which may be located in a first residence (R); a UE 115, which may be located in a second residence (R); and a UE 116, which may be a mobile device (M) like a cell phone, a wireless laptop, a wireless PDA, a server, or the like. The BS 103 provides wireless broadband access to the network 130 for a second plurality of UEs within a coverage area 125 of the BS 103. The second plurality of UEs includes the UE 115 and the UE 116. In some embodiments, one or more of the BSs 101-103 may communicate with each other and with the UEs 111-116 using 5G, long-term evolution (LTE), LTE-A, WiMAX, or other advanced wireless communication techniques.

Dotted lines show the approximate extents of the coverage areas 120 and 125, which are shown as approximately circular for the purposes of illustration and explanation only. It should be clearly understood that the coverage areas associated with eNBs, such as the coverage areas 120 and 125, may have other shapes, including irregular shapes, depending upon the configuration of the eNBs and variations in the radio environment associated with natural and man-made obstructions.

As described in more detail below, wireless network 100 can be a 5G communication system in which an electronic device, such as UE 116 or BS 102, can manage an antenna operating in a combination of frequency parts.

Although FIG. 1 illustrates one example of a wireless network 100, various changes may be made to FIG. 1. For example, the wireless network 100 could include any number of eNBs and any number of UEs in any suitable arrangement. Also, the BS 101 could communicate directly with any number of UEs and provide those UEs with wireless broadband access to the network 130. Similarly, each BS 102 and 103 could communicate directly with the network 130 and provide UEs with direct wireless broadband access to the network 130. Further, the BSs 101, 102, and/or 103 could provide access to other or additional external networks, such as external telephone networks or other types of data networks.

Figure 2:
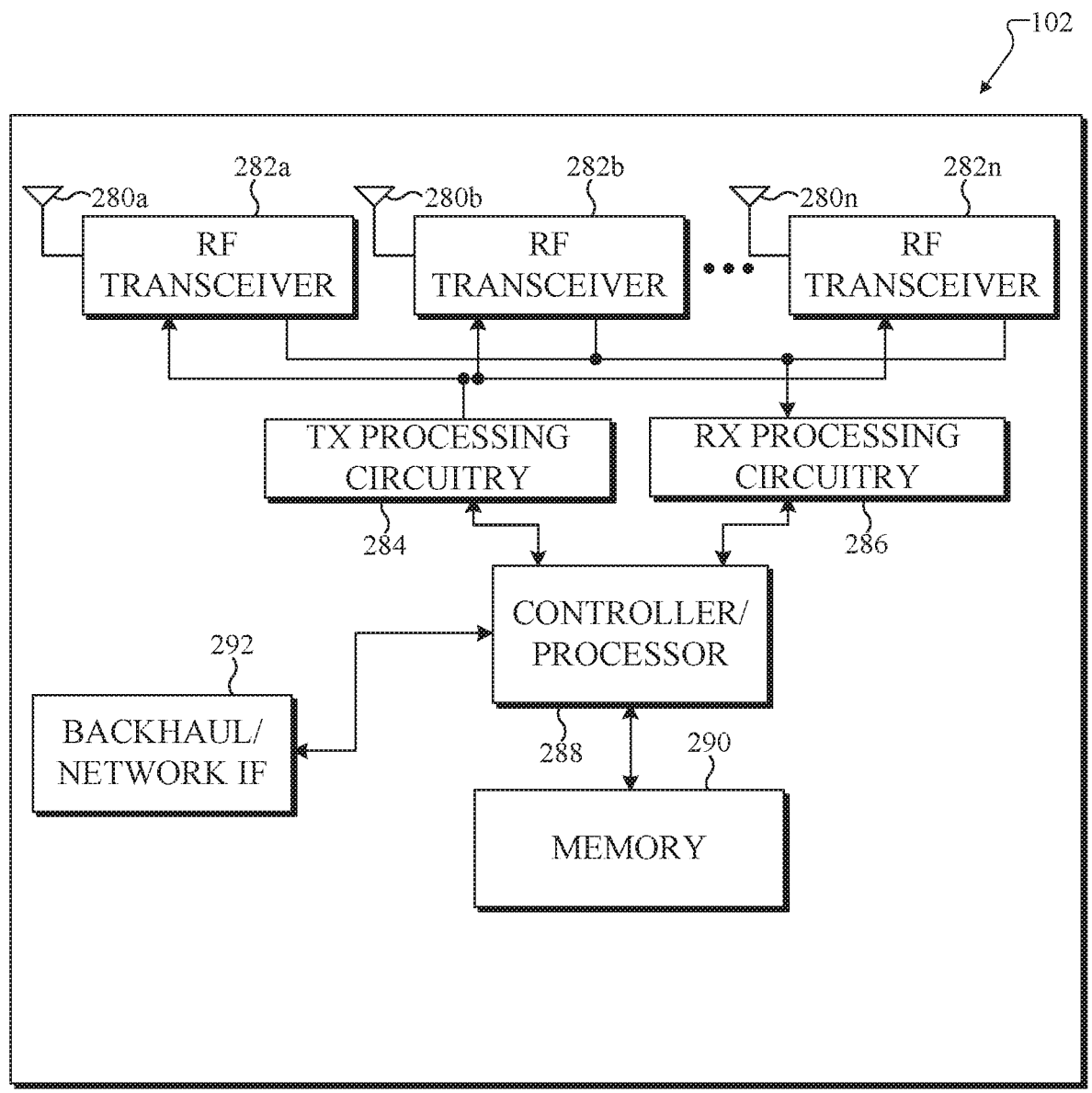
FIG. 2 illustrates an exemplary base station (BS) in the networked computing system according to various embodiments of this disclosure.

FIG. 2 illustrates an exemplary base station (BS) according to various embodiments of this disclosure. The embodiment of the BS 102 illustrated in FIG. 2 is for illustration only, and the BSs 101 and 103 of FIG. 1 could have the same or similar configuration. However, BSs come in a wide variety of configurations, and FIG. 2 does not limit the scope of this disclosure to any particular implementation of an BS or eNB.

As shown in FIG. 2, the BS 102 includes multiple antennas 280a-280n, multiple RF transceivers 282a-282n, transmit (TX) processing circuitry 284, and receive (RX) processing circuitry 286. The BS 102 also includes a controller/processor 288, a memory 290, and a backhaul or network interface 292.

The RF transceivers 282a-282n receive, from the antennas 280a-280n, incoming RF signals, such as signals transmitted by UEs or other BSs in the network 100. The RF transceivers 282a-282n down-convert the incoming RF signals to generate IF or baseband signals. The IF or baseband signals are sent to the RX processing circuitry 286, which generates processed baseband signals by filtering, decoding, and/or digitizing the baseband or IF signals. The RX processing circuitry 286 transmits the processed baseband signals to the controller/processor 288 for further processing.

The TX processing circuitry 284 receives analog or digital data (such as voice data, web data, e-mail, or interactive video game data) from the controller/processor 288. The TX processing circuitry 284 encodes, multiplexes, and/or digitizes the outgoing baseband data to generate processed baseband or IF signals. The RF transceivers 282a-282n receive the outgoing processed baseband or IF signals from the TX processing circuitry 284 and up-converts the baseband or IF signals to RF signals that are transmitted via the antennas 280a-280n.

The controller/processor 288 can include one or more processors or other processing devices that control the overall operation of the BS 102. For example, the controller/processor 288 could control the reception of forward channel signals and the transmission of reverse channel signals by the RF transceivers 282a-282n, the RX processing circuitry 286, and the TX processing circuitry 284 in accordance with well-known principles. The controller/processor 288 could support additional functions as well, such as more advanced wireless communication functions. For instance, the controller/processor 288 could support beam forming or directional routing operations in which outgoing signals from multiple antennas 280a-280n are weighted differently to effectively steer the outgoing signals in a desired direction. Any of a wide variety of other functions could be supported in the gNB 102 by the controller/processor 288. In some embodiments, the controller/processor 288 includes at least one microprocessor or microcontroller.

The memory 290 is coupled to the controller/processor 288. Part of the memory 290 could include a RAM, and another part of the memory 290 could include a Flash memory or other ROM. The controller/processor 288 is also capable of executing programs and other processes resident in the memory 290, such as a basic OS. The controller/processor 288 can move data into or out of the memory 290 as required by an executing process.

The controller/processor 288 is also coupled to the backhaul or network interface 292. The backhaul or network interface 292 allows the BS 102 to communicate with other devices or systems over a backhaul connection or over a network. The interface 292 could support communications over any suitable wired or wireless connection(s). For example, when the BS 102 is implemented as part of a cellular communication system (such as one supporting 5G, LTE, or LTE-A), the interface 292 could allow the BS 102 to communicate with other BSs and eNBs over a wired or wireless backhaul connection. When the BS 102 is implemented as an access point, the interface 292 could allow the BS 102 to communicate over a wired or wireless local area network or over a wired or wireless connection to a larger network (such as the Internet). The interface 292 includes any suitable structure supporting communications over a wired or wireless connection, such as an Ethernet or RF transceiver.

As described in more detail below, the BS 102 can set mobility management configurations for a UE, such as the UE 111 of FIG. 1, and may be a network entity. The BS 102 can obtain a current context of the UE 111. The current context of the UE 111 can be obtained from the UE 111, itself, or from another device, such as the server 400 of FIG. 1, In certain embodiments, the BS 102 obtains information from the UE and identifies the current context of the UE 111 based on the received information. The information can include, but not limited to, the current location of the UE 111 and a QoS of the UE 111. The BS 102 then uses the contextual information associated with the UE 111 to customize the mobility management configurations previously set for the UE 111. It is noted that the mobility management configurations for the UE 111 may differ from the mobility management configurations for the UE 112 based on differences in the current context associated with the UE 111 as compared to the UE 112. Additionally, the mobility management configurations for the UE 111 may change over a period of time based on changes to the context of the UE 111. For example, as the UE 111 moves within the coverage area 120 of the BS 102, the BS 102 can update (modify or change) the mobility management configurations for the UE 111.

Although FIG. 2 illustrates one example of BS 102, various changes may be made to FIG. 2. For example, the BS 102 could include any number of each component shown in FIG. 2. As a particular example, an access point could include a number of interfaces 292, and the controller/processor 288 could support routing functions to route data between different network addresses. As another particular example, while shown as including a single instance of TX processing circuitry 284 and a single instance of RX processing circuitry 286, the BS 102 could include multiple instances of each (such as one per RF transceiver). Also, various components in FIG. 2 could be combined, further subdivided, or omitted and additional components could be added according to particular needs.

Figure 3:
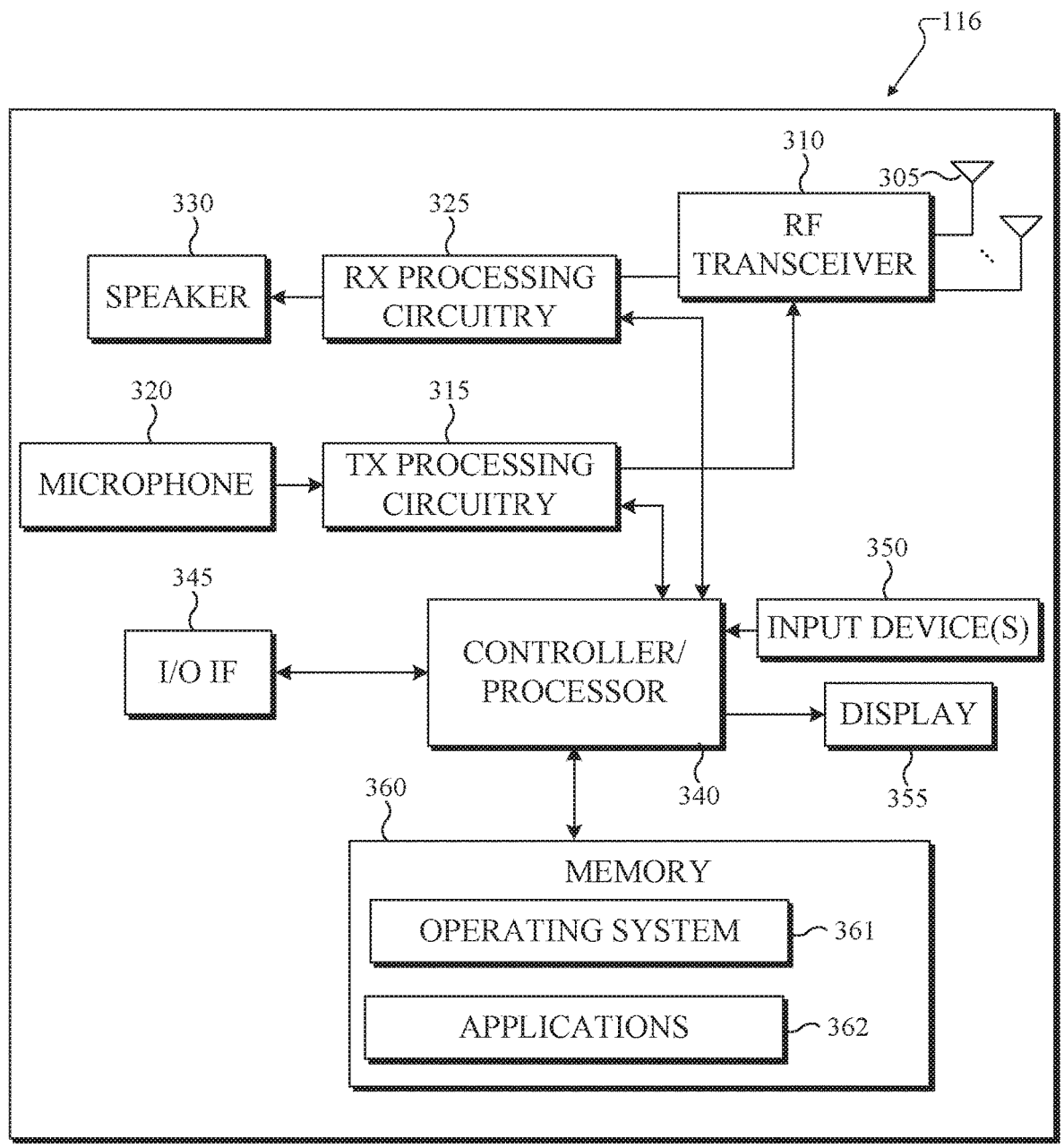
FIG. 3 illustrates an exemplary user equipment (UE) in the networked computing system according to various embodiments of this disclosure.

FIG. 3 illustrates an exemplary user equipment (UE) according to various embodiments of this disclosure. The embodiment of the UE 116 illustrated in FIG. 3 is for illustration only, and the UEs 111-115 of FIG. 1 could have the same or similar configuration. However, UEs come in a wide variety of configurations, and FIG. 3 does not limit the scope of this disclosure to any particular implementation of a UE.

As shown in FIG. 3, the UE 116 includes an antenna 305, a radio frequency (RF) transceiver 310, transmit (TX) processing circuitry 315, a microphone 320, and receive (RX) processing circuitry 325. The UE 116 also includes a speaker 330, a main processor 340, an input/output (I/O) interface (IF) 345, an input device(s) 350, a display 355, and a memory 360. The memory 360 includes a basic operating system (OS) program 361 and one or more applications 362.

The RF transceiver 310 receives, from the antenna 305, an incoming RF signal transmitted by an ENB of the network 100. The RF transceiver 310 down-converts the incoming RF signal to generate an intermediate frequency (IF) or baseband signal. The IF or baseband signal is sent to the RX processing circuitry 325, which generates a processed baseband signal by filtering, decoding, and/or digitizing the baseband or IF signal. The RX processing circuitry 325 transmits the processed baseband signal to the speaker 330 (such as for voice data) or to the main processor 340 for further processing (such as for web browsing data).

The TX processing circuitry 315 receives analog or digital voice data from the microphone 320 or other outgoing baseband data (such as web data, e-mail, or interactive video game data) from the main processor 340. The TX processing circuitry 315 encodes, multiplexes, and/or digitizes the outgoing baseband data to generate a processed baseband or IF signal. The RF transceiver 310 receives the outgoing processed baseband or IF signal from the TX processing circuitry 315 and up-converts the baseband or IF signal to an RF signal that is transmitted via the antenna 305.

The main processor 340 can include one or more processors or other processing devices and execute the basic OS program 361 stored in the memory 360 in order to control the overall operation of the UE 116. For example, the main processor 340 could control the reception of forward channel signals and the transmission of reverse channel signals by the RF transceiver 310, the RX processing circuitry 325, and the TX processing circuitry 315 in accordance with well-known principles. In some embodiments, the main processor 340 includes at least one microprocessor or microcontroller.

The main processor 340 is also capable of executing other processes and programs resident in the memory 360. The main processor 340 can move data into or out of the memory 360 as required by an executing process. In some embodiments, the main processor 340 is configured to execute the applications 362 based on the OS program 361 or in response to signals received from eNBs or an operator. The main processor 340 is also coupled to the I/O interface 345, which provides the UE 116 with the ability to connect to other devices such as laptop computers and handheld computers. The I/O interface 345 is the communication path between these accessories and the main processor 340.

The main processor 340 is also coupled to the input device(s) 350 and the display 355. The operator of the UE 116 can use a keypad as the input device 350 to enter data into the UE 116. The display 355 may be a liquid crystal display or other display capable of rendering text and/or at least limited graphics, such as from web sites.

The memory 360 is coupled to the main processor 340. Part of the memory 360 could include a random-access memory (RAM), and another part of the memory 360 could include a Flash memory or other read-only memory (ROM).

Although FIG. 3 illustrates one example of UE 116, various changes may be made to FIG. 3. For example, various components in FIG. 3 could be combined, further subdivided, or omitted and additional components could be added according to particular needs. As a particular example, the main processor 340 could be divided into multiple processors, such as one or more central processing units (CPUs) and one or more graphics processing units (GPUs). Also, while FIG. 3 illustrates the UE 116 configured as a mobile telephone or smartphone, UEs could be configured to operate as other types of mobile or stationary devices.

As described in more detail below, the UE 116 can transmit to a cell, such as the BS 102 information. The BS 102, or a component associated with the BS 102 then derives contextual information associated with the UE 116. The BS 102 then uses the contextual information associated with the UE 116 to customize various mobility management configurations for the UE 116. It is noted that the mobility management configurations for the UE 116 may differ from the mobility management configurations for the UE 111 based on differences in the current context associated with the UE 111 as compared to the UE 116. Additionally, the mobility management configurations for the UE 116 may change based on changes to the context of the UE 116. For example, as the UE 116 moves the mobility management configurations for the UE 116 can change.

Figure 4:
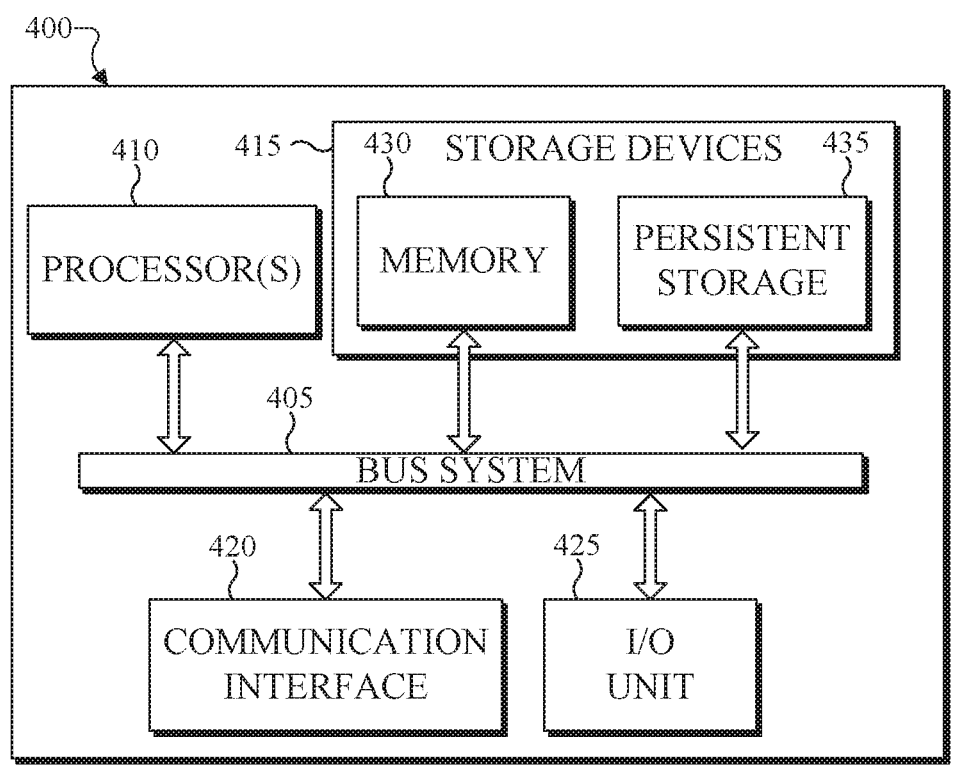
FIG. 4 illustrates an exemplary server in the networked computing system according to various embodiments of this disclosure.

FIG. 4 illustrates an exemplary server 400 according to various embodiments of this disclosure. The server 400 includes a bus system 405, which supports communication between at least one processing device such as the processor 410, at least one storage device 415, at least one communications interface 420, and at least one input/output (I/O) unit 425.

The processor 410 executes instructions that may be loaded into a memory 430. The processor 410 may include any suitable number(s) and type(s) of processors or other devices in any suitable arrangement. Example types of processor 410 include microprocessors, microcontrollers, digital signal processors, field programmable gate arrays, application specific integrated circuits, and discreet circuitry.

The memory 430 and a persistent storage 435 are examples of storage devices 415, which represent any structure(s) capable of storing and facilitating retrieval of information (such as data, program code, and/or other suitable information on a temporary or permanent basis). The memory 430 may represent a random access memory or any other suitable volatile or non-volatile storage device(s). The persistent storage 435 may contain one or more components or devices supporting longer-term storage of data, such as a ready only memory, hard drive, Flash memory, or optical disc.

The communications unit 420 supports communications with other systems or devices. For example, the communications unit 420 could include a network interface card or a wireless transceiver facilitating communications over the network 130 in FIG. 1. The communications unit 420 may support communications through any suitable physical or wireless communication link(s).

The I/O unit 425 allows for input and output of data. For example, the I/O unit 425 may provide a connection for user input through a keyboard, mouse, keypad, touchscreen, or other suitable input device. The I/O unit 425 may also send output to a display, printer, or other suitable output device.

As described in more detail below, the server 400 can obtains information associated with the UE 116 of FIGS. 1 and 3. The server 400 then identifies a current context associated with the UE 116 based on the received information. The server 400 can then transmit the identified context of the UE 116 to a BS, such as the BS 102 of FIGS. 1 and 2. The BS 102 can determine whether to update the mobility management configurations for the UE 116 based on the identified context of the UE 116. Additionally, the BS 102 can update the mobility management configurations for the UE 116 based on the identified context of the UE 116. In various embodiments, for example, the server 400 may be or can be located in a network entity such as a mobility management entity (MME), a core network (CN), or an access and mobility management function (AMF).

Figure 5:
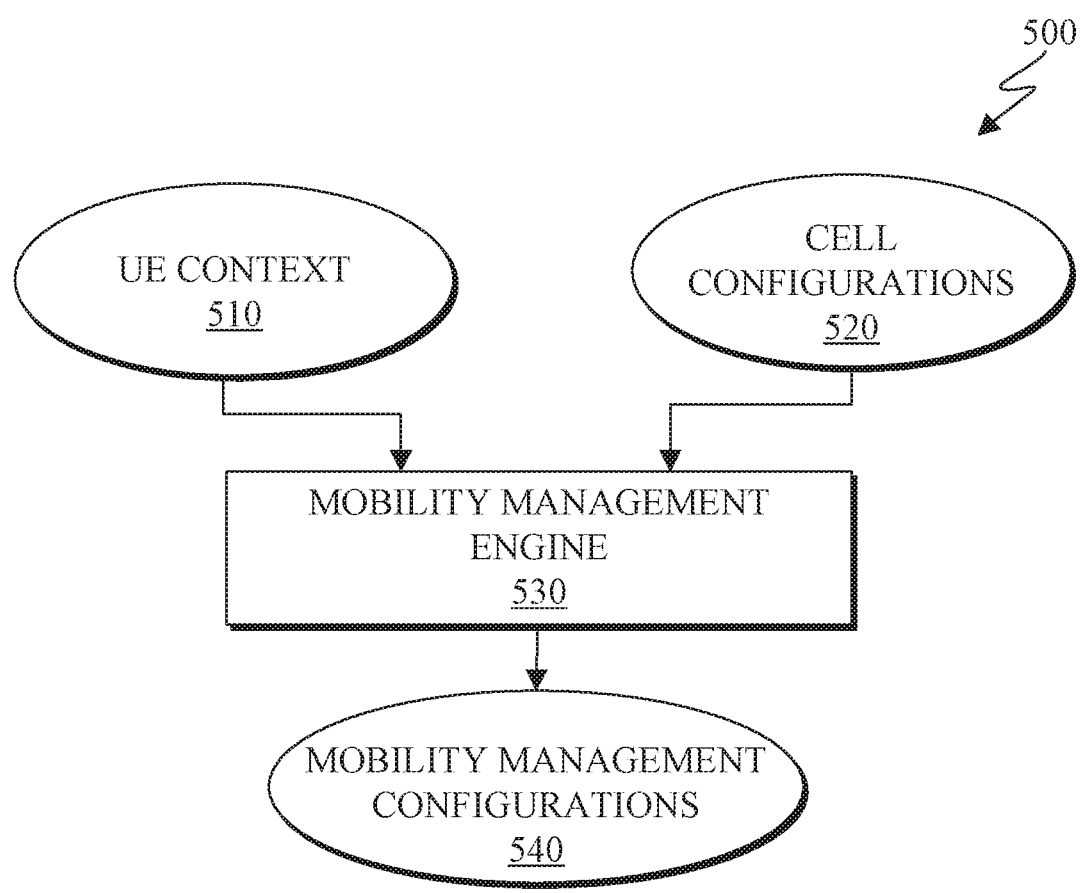
FIG. 5 illustrates an example diagram for generating mobility management parameters for a UE according to various embodiments of this disclosure.
Figure 6:
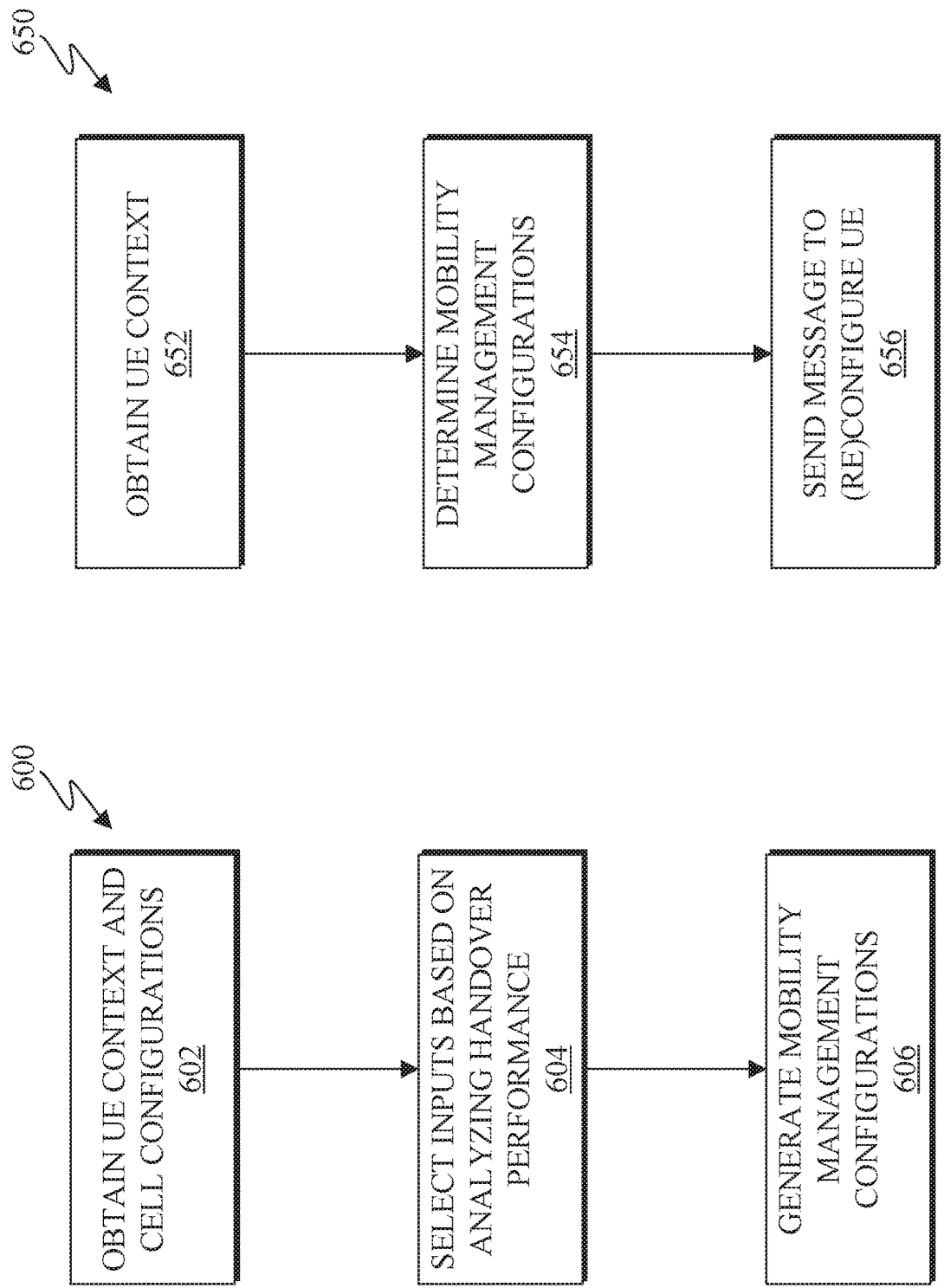
FIGS. 6A and 6B illustrate flowcharts for generating mobility management parameters for a UE according to various embodiments of this disclosure.

FIG. 5 illustrates an example diagram 500 for generating mobility management configurations for a UE according to various embodiments of this disclosure. FIGS. 6A and 6B illustrate flowcharts 600 and 650, respectively, for generating mobility management configuration parameters for a UE according to various embodiments of this disclosure. The diagram 500, the flowchart 600, and the flowchart 650 can be performed by any of the eNBs (such as the BS 102) or the server 400 of FIGS. 1, 2, and 4. The embodiment shown in FIGS. 5, 6A and 6B are for illustration only. Other embodiments are used without departing from the scope of the present disclosure.

As shown in FIG. 5, the mobility management engine 530 receives UE context 510 (such as contextual parameters) and cell configurations 520 as inputs. The mobility management engine 530 generates the mobility management configurations 540 based on the inputs (UE context 510 and cell configurations 520). That is, the mobility management engine 530 utilizes UE context 510 to determine the mobility management configurations 540 for the specific UE of the UE context 510.

The UE context 510 includes mobility context, QoS context, and network capability context. Mobility context is based on at least one of a location of the UE, a direction of travel of the UE, and a speed of travel of the UE. The mobility context can be used by the mobility management engine 530 to determine measurement event parameters. In certain embodiments the actual location of the UE (including longitude and latitude) is used. It is noted that the actual location can also include elevation. In other embodiments, a pseudo-location of the UE is used, where the UE location is specified relative to the center of the serving cell. For example, signal measurements can be used by the network to determine the pseudo-location of the UE. The pseudo-location of the UE can be combined with the GNSS-based location of the center of the cell to estimate the GNSS-based location of the UE. An artificial intelligence model can be used to estimate the UE location based on measurements. Identifying the pseudo-location of the UE is discussed in greater detail below.

QoS context is based on at least one of 5QI and ARP for standardized 5QIs and additional parameters such as Resource Type (such as a guaranteed bit-rate (GBR) or Non-GBR) and Packet Delay. The QoS context can used by the mobility management engine 530 to customize handover configuration (such as RA configuration for handover) by achieving resource-QoS tradeoff.

The network capability context is based on the type of networks (such as a traditional Terrestrial Network as compared to a Non-Terrestrial Network) and different configurations (such as non-standalone new radio (NSA NR) and standalone new radio (SA NR)) supported by the UE. The network capability context can also include the frequency bands supported by the UE.

The cell configurations 520 can include cell size and the environment type or deployment type. In certain embodiments, the environment type can be a rural environment type, an urban environment type, and a suburban environment type. The environment type or deployment type can also distinguish between low-band vs. millimeter wave band. The environment type or deployment type can be used to indicate initial or default configuration of mobility management engine 530 such as baseline or default handover parameters.

In certain embodiments, the cell configurations 520 can include a frequency band used by the UE and the cell. The cell configuration 520 can correspond to sub-6 GHz (or sub-7 GHz) deployment or a millimeter wave (mmW) deployment.

In certain embodiments, different network architectures such as Non-Standalone NR with the EPC (i.e., EUTRA-NR Dual Connectivity or EN-DC) and Standalone NR with the 5GC are used as cell configurations 520.

The mobility management engine 530 can determine an initial mobility management configuration based on the cell configuration 520. In certain embodiments, the initial mobility management configuration is determined when a signaling connection between the UE and the network entity is initially established or reestablished. After receiving the UE context 510, the mobility management engine 530, can then determine whether to the update the initial mobility management configuration based on the UE context 510.

For example, the mobility management engine 530 selects one mobility management configuration 540 for one cell configuration (based on the environment, cell size, frequency band, or network architecture) and a different another mobility management configuration for another Cell Configuration based on different UE contexts. For instance, the mobility management engine 530 can keep a delay-tolerant low-complexity Internet of Things (IoT) device on the underlying LTE network and hence may not configure such IoT device to operate in the dual connectivity mode in an EN-DC network.

Parameters such as hysteresis and time-to-trigger specify when and how fast the detected cells are reported to the network entity (such as an eNB or gNB). According to embodiments of the present disclosure, the mobility management configurations 540 can update handover parameters such as the hysteresis and time-to-trigger as a function of the UE speed so that handover can be accelerated for fast-moving devices. A blanket reduction of timers or hysteresis increases the signaling load but a judicious selection, by the mobility management engine 530, can strike a target balance between the speed of handover and the signaling load. Potential inputs include the cell size (such as big, medium, or small), type of environment (such as rural, suburban, or urban), the frequency band (e.g., low band vs. mmW band) and the UE speed (such as high, medium, or low) and potential outputs are threshold, offset, hysteresis, and time-to-trigger.

The mobility management engine 530 can update the mobility management configurations as indicated by the cell configurations 520 based on the UE context 510 to generate the mobility management configurations 540. In certain embodiments, one of the mobility management configurations 540 can include Event-based Reporting Configuration. That is, the mobility management engine 530 can change various Event-based Reporting Configurations, as originally indicated by the cell configurations 520, based on the UE context 510 that is dynamic or default. For example, the UE sends a Measurement Report when the condition, as described in Equation (1) is satisfied for the duration of time-to-trigger.

$$Mn+Ofn+Ocn-Hys>Mp+Ofp+Ocp+\text{Off} \qquad \text{Equation (1)}$$

As described in Equation (1), Mn is the measurement (such as the signal strength) of the neighbor and Mp is the measurement (such as the signal strength) of the current cell. Equation (1) describes whether the effective signal strength of the neighboring cell, Mn, is greater than the signal strength of the current cell, Mp. As an example, the mobility management engine 530 adapts one or more of Hys (hysteresis), Off (i.e., Offset), and time-to-trigger. It is noted that the BS (eNB or gNB) specifies Hys, Off, and time-to-trigger in an RRC Reconfiguration message in 5G and RRC Connection Reconfiguration message in LTE.

In certain embodiments, one of the mobility management configurations 540 can include Periodical Reporting Configuration. That is, the mobility management engine 530 can change a Periodical Reporting Configuration, as originally indicated by the cell configurations 520, based on the UE context 510. For example, when periodic reporting is used for measurement reporting (such as in support of Self-Organizing Network (SON) or Minimization of Drive Testing (MDT) measurements), periodicity of reporting can be adjusted based on the UE context 510. For instance, the Framework or the Engine adapts the parameter "ReportInterval" residing in the Information Element (IE) "PeriodicalReportConfig" in an RRC Reconfiguration message.

In certain embodiments, one of the mobility management configurations 540 can include configuring White List of Neighbor Cells. That is, the mobility management engine 530 can modify the White List of Neighbor Cells, as originally indicated by the cell configurations 520, based on the UE context 510. For example, in LTE, the UE autonomously searches neighbor cells, while in 5G, the network can provide the neighbor list to the UE for a faster and more efficient cell search. As such, the mobility management engine 530 can utilize the UE context 510 (such as the location of the UE) to create different neighbor lists for UEs in different parts of the cell and the gNB (such as the BS) conveys such neighbor lists to UEs using RRC Reconfiguration messages. For instance, the parameter whiteCellsToAddModList in the IE MeasObjectNR is used to create the white list per UE context. That is, different white lists can be provided to different UEs based on their pseudo location and direction of travel. For example, if the UE is in the Eastern portion of the cell and is moving East, the mobility management engine 530 can determine an updated mobility management configuration 540 that includes one set of white list cells for monitoring. In contrast, if the UE is in the Western portion of the cell and is moving West, the mobility management engine 530 can determine another updated mobility management configuration 540 that includes a different set of white list cells for monitoring.

In certain embodiments, one of the mobility management configurations 540 can include configuring the 'Type of Random Access' and 'Type of Connectivity' for Handover. That is, the mobility management engine 530 can update the 'Type of Random Access' and 'Type of Connectivity,' as originally indicated by the cell configurations 520, based on the UE context 510. The QoS Context, of the UE context 510, along with the capability of the UE can be used by the mobility management engine 530 to determine what type of random access the UE should use for handover. For example, example mechanisms associated with handover include 4-step Random Access (RA), 2-step RA, and Dual Active Protocol Stack (DAPS). It is noted that the handover-enhancing 2-step RA and DAPS are complex and consume more resources. Depending upon the QoS of existing (5G) QoS Flows or Evolved Packet System (EPS) Bearers, the network can configure these more complex resource-intense mechanisms if QoS Flows require a more stringent QoS (e.g., URLLC and low-latency eMBB) and use the simpler and less resource-consuming RA for best effort QoS. For instance, the mobility management engine 530 can configure resources for the 2-steps Random access (and DAPS for DAPS-capable UEs) for a UE with QoS Flows with 5QI=80, 83, and 84. Furthermore, the network can configure resources for the 4-steps Random access for a UE with QoS Flow with 5QI=8 or 9. The modified mobility management configuration 540 can be conveyed by the network entity (such as the BS) to UEs in an RRC Reconfiguration message.

In certain embodiments, the mobility management engine 530 uses an objective function formula to determine the target tradeoff based on one or more performance metrics. The performance metrics can include a tradeoff between the signaling load (such as the number of handovers) and the handover delay. Equation (2) describes the objective function.

$$OF = \text{coeff}(1)*\text{Metric}(1) + \text{coeff}(2)*\text{Metric}(2) + \ldots + \text{coeff}(N)*\text{Metric}(N) \quad \text{Equation (2)}$$

As described in Equation (2), the metric(1) can describe a metric such as a normalized value of overall handover signaling delay, while the metric(2) can describe a metric such as a normalized value of the signaling cost (a number of handovers can be used an indicator of the signaling cost). It is noted that additional metrics, such as matric(N) can be included in the objective formula. For example, a metric such as normalized throughput can be included in the objective function as described in Equation (2). A weight (denoted of a coefficient) is applied to each of the metrics. For example, coeff(1), coeff(2), through coeff(N) are coefficients that are determined based on the UE Context 510. In certain embodiment, the sum of all of the coefficients (such as coeff(1), coeff(2), through coeff(N)) total to the value of 1.0. Different numerical values can be chosen for different coefficients to give different weight or importance to different Metrics. For example, coeff(1)=coeff(2) (such that each coefficient is 0.5) applies an equal weight to the two Metrics, Metric(1) and Metric(2). In contrast, when the coeff(1)=0.9 and coeff(2)=0.1, more importance is given to Metric(1) as compared to the Metric(2). As the candidate mobility configurations are changed, the process identifies which candidate configuration maximizes the Objective Function of Equation (2) based on the current context of the UE.

In certain embodiments, an RRC signaling message such as RRC Reconfiguration is used to update mobility management configuration (e.g., handover parameters) when there is an appreciable change in the parameter settings (such as a certain change such as 20% change in the numerical value of a parameter). The appreciable change can be based on a threshold. For example, a threshold can be compared to the difference between the modified mobility management configuration 540 and the default (or previous) management configuration. Based on the comparison, the network entity (such as a BS, gNB, or eNB) can cause an RRC signaling message to be sent to the UE. That is, after the mobility management engine 530 generates the mobility management configurations 540 and the difference between the new mobility management configuration 540 and the currently used mobility management configuration exceeds a threshold, the RRC Reconfiguration message can be used to notify and configure/reconfigure the UE of the changed configuration.

In certain embodiments, the mobility management engine 530 utilizes UE contexts of different UEs in a cell to determine if the SON/MDT should be activated for a given UE. For example, the mobility management engine 530 can use the UE location (as indicated by a single UE via the UE context 510) to activate the MDT for the UE in the specific geographic area of the cell, where the network does not yet have adequate measurements in that portion of the cell. That is, the mobility management engine 530 can identify portions of the cell where MDT measurements are needed based on the UE contexts from many UEs located throughout the cell. After identifying the portion of the cell where target MDT measurements are needed, the mobility management engine 530 can identify specific UEs that are located in the identified portion of the cell, based on their corresponding location as indicated by those UE context and determine an updated mobility management configuration 540. Similarly, for idle mode UEs, the MDT can be activated based on the need to explore the propagation environment. Furthermore, if a long time, based on a predefined time threshold, has elapsed since the propagation environment has been mapped via drive test or MDT measurements (e.g., six months), the SON/MDT measurements can be activated to evaluate if new topographical features (e.g., trees or buildings) have emerged, affecting the RF propagation and hence the accuracy of the predictions of propagation models.

In certain embodiments, the mobility management engine 530 is an Expert System that utilizes a series of "IF-THEN" rules to determine the mobility management configurations 540. In certain embodiments, the mobility management engine 530 is a Fuzzy Logic System (FLS) for determining the mobility management configurations 540. In yet another embodiment, the mobility management engine 530 is a neural network (or another network that mimics an Expert System or FLS) to determine the mobility management configurations 540.

The flowchart 600 of FIG. 6A illustrates the determination of structure of the mobility management engine 530. In step 602, the BS obtains various information. For example, in step 602 the BS obtains measurements of the UE pseudo location, speed and direction of travel for different combinations of white lists, threshold values, hysteresis values, and time-to-trigger values. The BS also obtains cell configurations 520 such as the cell size and the type of environment of the cell. The BS also obtains quality of handover performance. In step 604, the BS analysis the handover performance trends and selects optimal inputs for the mobility management engine 530. In step 606, the BS design the mobility management engine 530 using IF-THEN rules, Fuzzy Logic Systems, Artificial Neural Networks, and the like, or any combination thereof. Potential target outputs (mobility management configurations 540) of the mobility management engine 530 are UE specific.

The flowchart 650 of FIG. 6B illustrates a process for real-time mobility management using the mobility management engine 530 of FIG. 5. In step 652, the BS obtains various information. For example, in step 652 the BS obtains a UE pseudo location, a speed, and a direction of travel of a particular UE. In step 654 the BS using the mobility management engine 530 determines UE specific White Lists and threshold values, hysteresis values and time-to-trigger values to be updated in the mobility management configurations. In step 656 the BS sends an RRC reconfiguration (or equivalent message) to configure (or reconfigure) the UE based on the updated mobility management configurations.

Although FIGS. 5, 6A, and 6B illustrates one example of managing a network entity in a wireless communication system, various changes can be made to FIGS. 5, 6A, and 6B. For example, while shown as a series of steps, various steps in FIGS. 6A, and 6B could overlap, occur in parallel, or occur any number of times.

Figure 7:
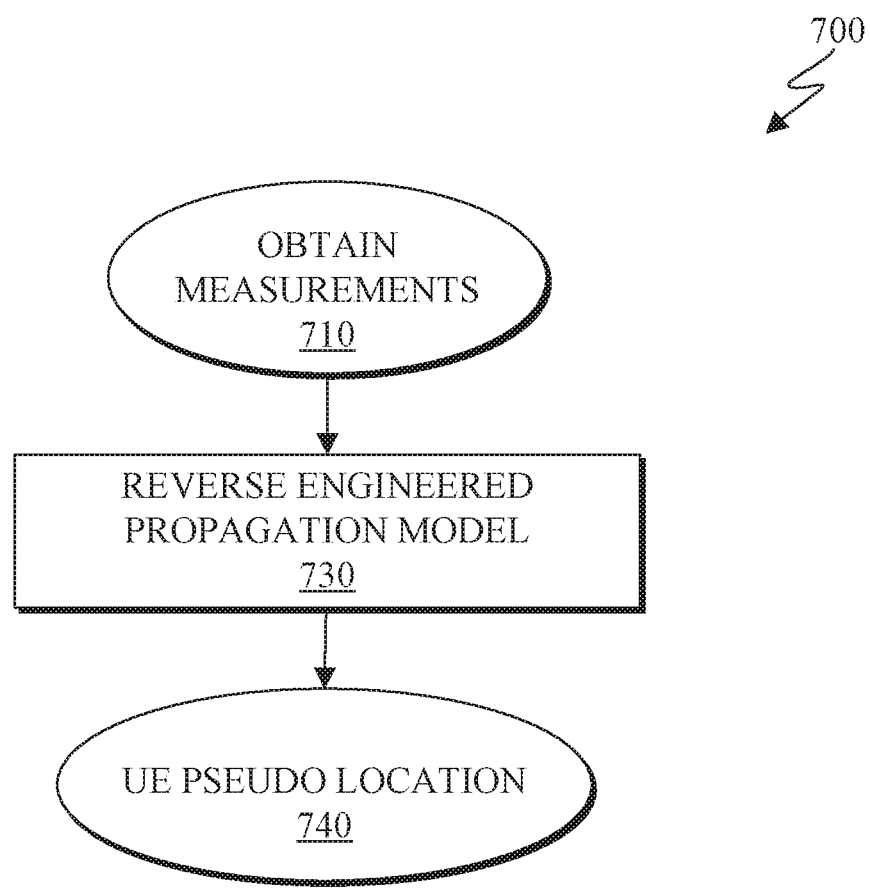
FIG. 7 illustrates an example diagram for generating a pseudo location of a UE according to various embodiments of this disclosure.
Figure 8:
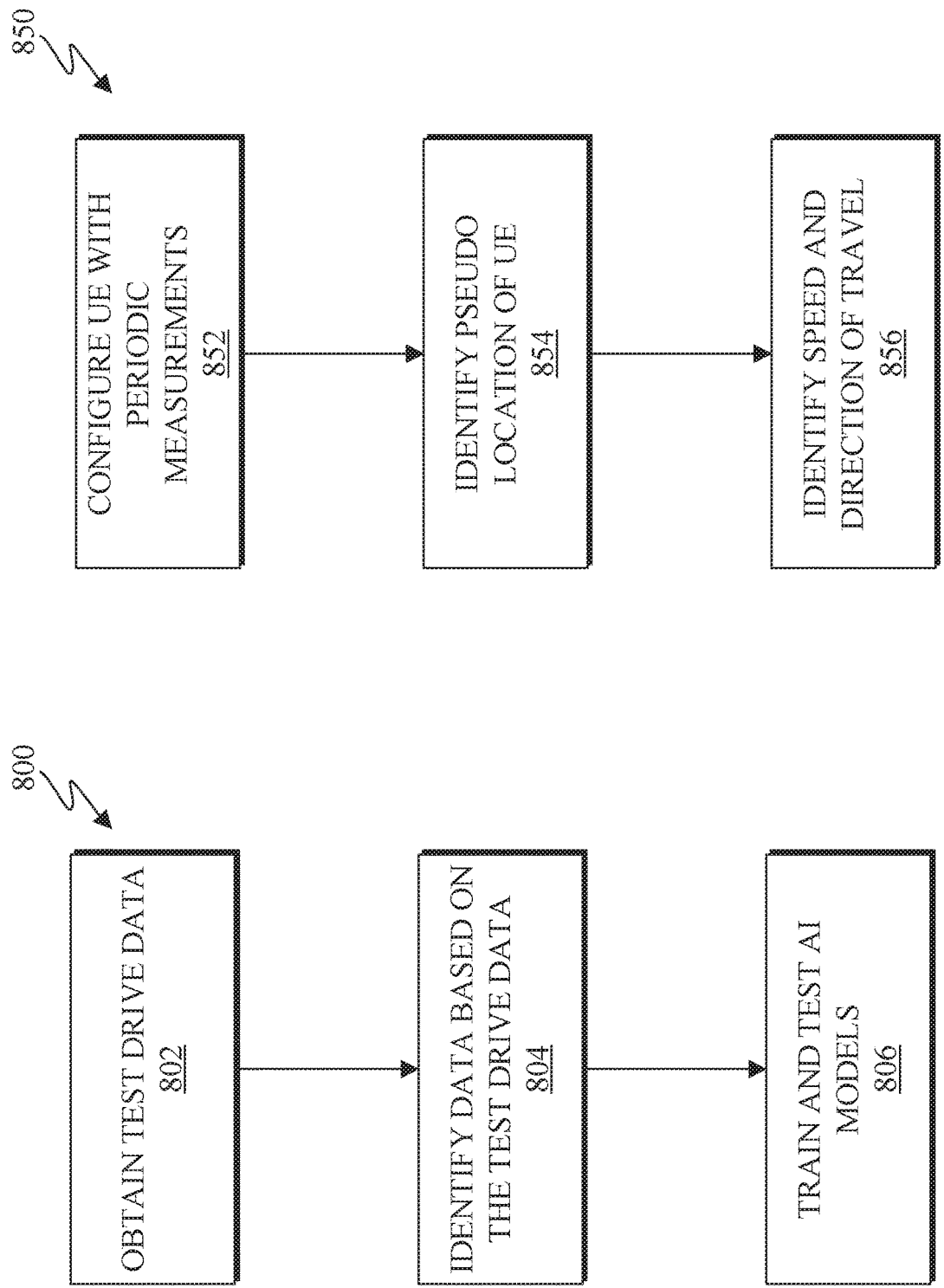
FIGS. 8A and 8B illustrate flowcharts for identifying the location of the UE according to various embodiments of this disclosure.
Figure 9:
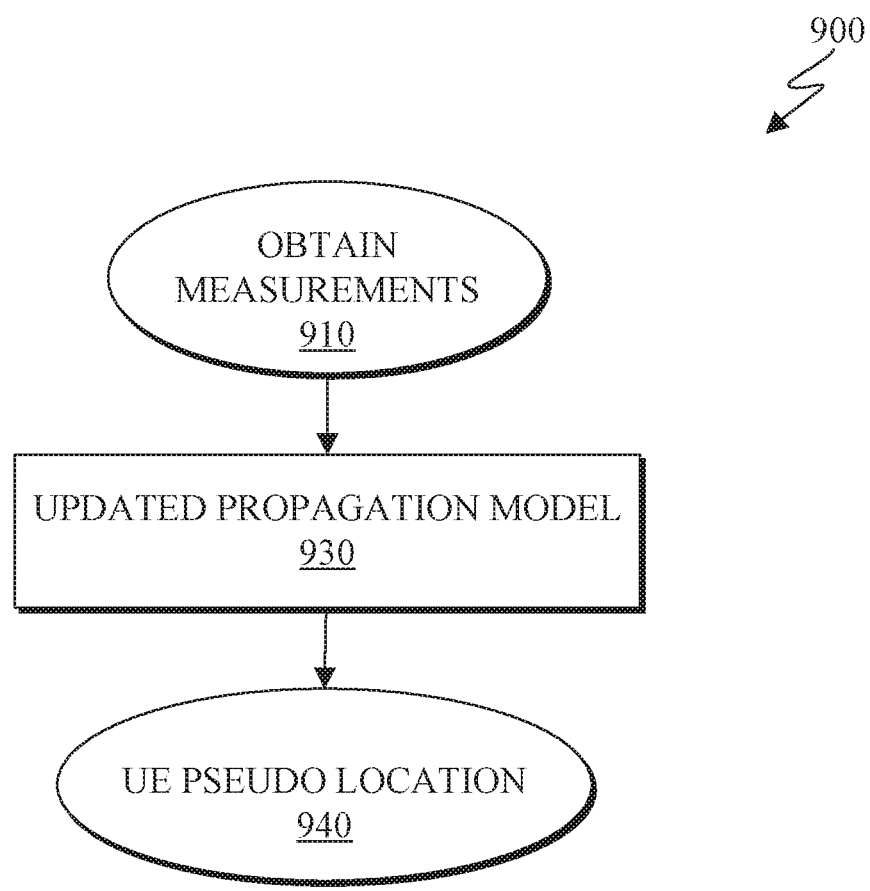
FIG. 9 illustrates an example diagram for updating the generated pseudo location of a UE according to various embodiments of this disclosure.

FIGS. 7, 8A, 8B, 9, 10A, and 10B describe methods of generating a pseudo location of a UE based on the UE context 510 of FIG. 5. For example, FIG. 7 illustrates an example diagram 700 for generating a pseudo location of a UE according to various embodiments of this disclosure. FIGS. 8A and 8B illustrate flowcharts 800 and 850, respectively, for identifying the location of the UE according to various embodiments of this disclosure. FIG. 9 illustrates an example diagram 900 for updating the generated pseudo location of a UE according to various embodiments of this disclosure. FIGS. 10A and 10B illustrate flowcharts 1000 and 1050, respectively, for updating the location of the UE according to various embodiments of this disclosure. The diagrams 700 and 900 and the flowcharts 800, 850, 1000, and 1050 can be performed by any of the gNBs (such as the BS 102) or the server 400 of FIGS. 1, 2, and 4. The embodiment shown in FIGS. 7, 8A and 8B are for illustration only. Other embodiments are used without departing from the scope of the present disclosure.

Embodiments of the present disclosure use artificial intelligence (AI) to determine a pseudo-location of the UE in a cell. Once the UE location is known, UE speed and direction of travel can be estimated from previous UE contexts. The pseudo-location of the UE along with speed and direction estimates can then be used in various radio resource management (RRM) operations carried out by the gNB. The location of the UE determined can also be used for selected positioning use cases (such as location-based advertising, asset tracking, and patient and medical equipment tracking outside hospitals), where lower tens of meters of accuracy is sufficient.

Various radio interface related mechanisms such as handover and UE power saving and some positioning use cases benefit from UE localization. FIGS. 7 through 10B describe embodiments for a quick and accurate estimate of the UE location by exploiting measurements available in 5G along with a tuned AI-driven propagation model. For Example, 5G offers a variety of services with distinct QoS requirements and is expected to cater to different verticals or industries. One of the important capabilities is UE positioning or localization, where the UE location in a given cell (or sector) is estimated. There are numerous UE localization techniques (such as GPS-based location reporting, RF fingerprinting based on Reference Signal Received Power (RSRP) measurements, and triangulation based on time-difference-of-arrival (TDOA)).

Embodiments of the present disclosure take into consideration that certain handover parameters that are agnostic to specific UEs. For example, regardless of the UE or the location of the UE the same or similar handover parameters are used. Additionally, a gNB, while performing its routine operations such as paging, random access, RRC connection setup, call admission control, DRB setup, data transfer, and mobility management, may not make use of a propagation model that is specifically tuned for the cells it is managing.

A tuned propagation model is used in network planning and design tools (NPDTs) to predict the propagation path loss for the known receiver location. For example, NPDTs are used to determine deployment configurations before a network is launched and used for network RF optimization after the network is operations. However, NPDTs work by themselves and do not interact dynamically or frequently with gNBs in the normal course of operations. As such, planning a network using a NPDT and the real-time gNB operations are decoupled from each other in commercial networks.

Embodiments of the present disclosure provide an AI-driven tuned propagation model that reverse-engineers the operation of a tuned propagation model of NPDTs. More specifically, the AI-driven tuned propagation model uses signal measurements (e.g., RSRPs) and associated Beam IDs reported by UEs as the input and predicts the pseudo-location for the RRC-CONNECTED UE. Furthermore, the AI model can be retrained using MDT-based measurements to semi-automatically adapt to any long-term changes in the cell's propagation environment.

Therefore, embodiments of the present disclosure provide system and methods for customizing handovers based on the location (or UE pseudo-location) of the UE to facilitate early detection of a target cell for faster and correct handover. The measurement burden on the UE in support of RRM can be reduced by informing the UEs about specific cells to be monitored ("whitelist"). Furthermore, advanced beam management can be implemented (such as selection of specific Transmission Configuration Indication (TCI) States).

The formal 3D location of the UE is (Latitude, Longitude, and possibly Elevation). The pseudo-location of the UE is the location of the UE relative to the Base Station in the serving cell. In certain embodiments, a 2D pseudo-location of the UE can be expressed as polar coordinates (r, θ) or Cartesian coordinates ($x=r*\cos(\theta)$, $y=r*\sin(\theta)$), where r is the distance in meters between the gNB and the UE, and θ is the angle measured counter-clockwise from the East. For example, the UE that is at a distance of 50 m from the gNB and situated north of the gNB has the pseudo-location (r=50 m, θ=90°). The polar coordinates can be converted into Cartesian coordinates using the gNB location as the origin (0 m, 0 m). The equivalent representation of (r=50 m, θ=) 90° in Cartesian coordinates is (0 m, 50 m).

If needed, the 2D pseudo-location of the UE can be translated into the formal 2D location by using the gNB's (Latitude, Longitude). For example, pseudo-location of the UE is combined with the GNSS-based location of the center of the cell to estimate the GNSS-based location of the UE. Additionally, if the UE's elevation can be estimated, the 2D pseudo-location can be translated into the formal 3D location.

In certain embodiments, the cell's coverage area can be divided into bins, where bins are (x m by y m) areas. Such bins are often used in MapInfo-type maps and RF network planning tools. The pseudo-location of the UE can be approximated to be the center of such bin.

In order to estimate the pseudo location of the UE, the AI-based propagation model accepts real-time measurements of serving cell and neighboring cell RSRPs and Beam IDs reported by the UE. Thereafter, the AI-based propagation model predicts the UE's pseudo-location.

In certain embodiments, there are three methods of obtaining the RSRP measurements from the UE to the gNB in NR. The methods in (i) handover-like measurement configuration, (ii) Channel State Information (CSI)-related measurement configuration, and (iii) MDT based measurement configuration. Handover-like measurements and CSI-related measurements are suitable as real-time input into an AI-based propagation model to predict the pseudo-location of the UE, while MDT-based measurements can be used to re-train the AI propagation model offline for enhanced reliability or accuracy (such as transforming a clutter-based propagation model into the cell-specific propagation model and to reflect changes in the environment such as new construction or new trees).

In the handover-like measurement configuration the serving gNB can configure the UE to report RSRP (Input 1) of one or beams in one or more cells periodically through RRC signaling such as NR RRCReconfiguration. The UE then sends MeasurementReport to the serving gNB containing RSRP. The goal is to restrict the types of measurements (e.g., use RSRP only and avoid RSRQ and SINR), the number of reported cells (e.g., only the cells that meet specific threshold criteria with the upper limit of two or three neighboring cells) and periodicity of measurements to reduce the amount of air interface signaling and to reduce processing at the UE and the network while keeping the location estimation fresh.

3GPP Release 15-based networks support, via RRC signaling, the periodicity of RSRP measurements ranging from 120 ms to 30 minutes, which provides significant flexibility. The RRC Information Element (IE) ServingCellConfig contains servingCellMO, which points to MeasObjectId of MeasObjectNR in MeasConfig. RRCReconfiguration specifies MeasConfig that specifies measurement object (MO) (e.g., NR Carrier Frequency and PCI), measurement quantity (e.g., ssb-RSRP) and ReportConfig (with periodic measurements such as ReportInterval, reportAmount (e.g., 1 report to infinity), and NR-RS-Type (e.g., SSB or CSI-RS). In certain embodiments, RSRP of the serving cell is calculated as the best beam's RSRP. In other embodiments, the average of N (configurable) strong beams is used.

In the CSI measurement configuration, one of the CSI quantities that the UE can be asked to report is L1-RSRP. CSI-ReportConfig that is part of CSI-MeasConfig includes CSI-ReportPeriodicityAndOffset. For example, the reporting periodicity of L1-RSRP (SSB is preferred but both SSB and CSI-RS are supported by 3GPP) ranges from 4 slots to 320 slots, which implies the slowest periodicity from 4 ms to 320 ms for Frequency Range 1 (FR1) and the fastest periodicity from 0.5 ms to 40 ms for Frequency Range 2 (FR2). Again, there is adequate flexibility to strike a balance between the amount of RRC signaling and granularity of the location estimate. It is noted that the slower the UE moves the finer the granularity or resolution of the location estimate that can be achieved for a given fixed measurement period.

In the MDT based measurement configuration, 3GPP is actively working on 5G SON algorithm/feature of MDT, where the UE can be configured to make measurements of the serving cell and neighboring cells in RRC_CONNECTED, RRC_INACTIVE, and RRC_IDLE.

There are at least two quantities of measurements (i) RSRP and (ii) beam ID. RSRP can be used to estimate the relative distance between the UE and the gNB. With respect to the beam ID, the gNB is aware of the currently serving beam because it is communicating with the UE inside a specific beam. Furthermore, the UE reports the beam ID in the form of SSBRI and/or CRI based on gNB-dictated configuration.

If the measurement reporting frequency is high, the granularity of the location estimation would be fine or high-resolution but the RRC signaling load would be higher. The right balance depends on the gNB operation to be optimized, expected maximum UE speed, and normalized beam-crossing rate in the horizontal plane. Performance evaluation using simulations can help determine a good value of the periodicity of the measurements in different situations, and a simple traditional rule based or enhanced fuzzy logic based algorithm can be used to choose the settings of measurement parameters. In general, the slowest possible frequency of measurements should be chosen, which meets accuracy requirements for the target gNB operation.

As shown in FIG. 7, the reverse engineering propagation model 730 obtains measurements 710. The measurements 710 can be associated with a UE and used to identify a pseudo location 740 for the UE. The measurements 710 can be from signals of the UE such as an RRC measurement report and CSI. The measurements can include RSRPs, beam IDs (from the serving cell and a number of neighboring cells), and the like. The reverse engineered propagation model 730 can be an AI driven propagation model. The reverse engineered propagation model 730 can be trained offline using a supervised learning of a neural network. The identified UE pseudo location 740 can be in cartesian or polar coordinates relative to the gNB.

While the pseudo location of a UE is useful for customizing the mobility management configurations, as described above, additional contextual information such as the speed of the UE and direction of the UE travel can be derived and then used to provide further customized mobility management configurations. For example, speed can be estimated as distance divided by the time interval between two periodic measurements. This gives an instantaneous speed. Alternatively and/or additionally, a simple filter can be used that can give X % (e.g., 80%) weight to the current instantaneous speed estimate and the remaining (100−X) % weight to the previous estimate. The baseband chipset at the gNB could potentially estimate the UE speed based on physical layer measurements. Direction can be estimated from a set of the last N (e.g., N=2 to 4) UE pseudo-locations. For example, the last N pseudo-locations can be used to estimate the direction of UE travel. Such instantaneous direction can also be filtered like the speed estimation. The information about the direction of UE's travel can be used in operations such as beam set selection for CSI reporting, white-list of cells for handover measurements, and adjustment of UE-reported CQI.

In certain embodiments, the measurements from one or more beams in the serving cell can be used without any neighboring cell measurements. In other embodiments, the one or more beams of the serving cell and one or more beams of one or more neighboring cells can be used to identify the pseudo location of the UE 740.

In certain embodiments, a reverse engineering propagation model 730 can use a non-neural network architecture such as Support Vector Machine. In other embodiments, the reverse engineering propagation model 730 can be an artificial neural network located in a real time gNB, non-real time gNB or a remote server. The artificial neural network can be a multilayer perception (MLP), radial basis function network (RBFN), or the like. The reverse engineering propagation model 730 is trained under a supervised environment. The inputs to the artificial neural network (such as the reverse engineering propagation model 730) can include RSRP_1 of the serving cell, RSRP_2 of the strongest neighbor, and/or RSRP_3 of the second strongest neighbor, and the associated SSB ID's (such as SSBRIs). For validation, the artificial neural network (such as the reverse engineering propagation model 730) can use the RSRP from the test set. In certain embodiments, a first artificial neural network can be selected when all three RSRPs with beam IDs are available, while a second artificial neural network can be selected when RSRP_1 and RSRP_2 are available. When only RSRP_1 is available a third artificial neural network can be selected. The outputs of the artificial neural network (such as the reverse engineering propagation model 730) can include the pseudo location of a UE. The pseudo location of a UE can be expressed as polar coordinates (r, θ) or Cartesian coordinates (X, Y).

In certain embodiments, the reverse engineering propagation model 730 is adjusted for enhanced path loss prediction. The reverse engineering propagation model 730 is adjusted using an intelligent MDT configuration and is used for estimating the pseudo location of the UE. Propagation path loss prediction is used in radio network planning as it helps determine the Base Station locations and a set of Base Station parameters such as antenna down-tilt and antenna azimuth.

The reverse engineering propagation model 730 can obtain new data using an intelligent MDT configuration. An intelligent MDT configuration involves activating MDT for selected UEs based on factors such as UE's pseudo-location, bin ID, time of the day, Power Headroom Report (PHR), frequency band of operations, and UE capabilities (e.g., low-rate IoT device—avoid, smartphones—ok to use). Propagation path loss prediction reflects distance-based path loss and topology/clutter and does not consider short-term fading effects. Hence, RSRP measurements averaged over a suitable time window are adequate. Furthermore, the RSRP measurements are not typically influenced by the amount of co-channel interference in a well-optimized network. Hence, MDT can be activated when a cell is lightly loaded or medium loaded.

In certain embodiments, the reverse engineering propagation model 730 can be provided to the NPDT for future optimization activities or redesigns due to capacity augmentations via the additional of small cells.

Flowchart 800 describes a procedure to train the reverse engineered propagation model 730 of FIG. 7. For example, in step 802 test drive data that includes location based RSRPs is obtained. In step 804 a Network Planning and Design Tool (NPDT) is used to derive data for use with the AI model. For example, the data can include a UE pseudo location, beam ID and RSRP of the strongest cell and beam IDs and RSRPs for up to N strongest neighboring cells that meet the cell selection criteria. In step 806, the multiple AI models are trained and tested. A first AI model, of the multiple AI models, can accept beam ID_1 and RSRP_1 as an input, where the beam ID_1 and the RSRP_1 correspond to the serving cell or the strongest cell. A second AI model, of the multiple AI models, can accept beam ID_1, RSRP_1, beam ID_2, and RSRP_2 as inputs. A third AI model, of the multiple AI models, can accept beam ID_1, RSRP_1, beam ID_2, RSRP_2, ID_3, and RSRP_2 as inputs. The target output is the UE pseudo location for all of the models.

Flowchart 850 of FIG. 8B describes a procedure of using the trained artificial neural network in real-time operations. In step 852, the gNB configures the UE with periodic measurements, such as RSRPs and beam IDs of the X strongest beams of M cells that meet a predefined threshold criteria for an adequate signal strength. In step 854, the gNB predicts the pseudo location of the UE using the trained AI model. In step 856, the gNB estimates the speed of the UE (such as miles per hour, meters per second, and the like) and the direction of travel (such as East, North-East, North-North-East, and the like). The gNB estimates the speed of the UE and the direction of travel using any suitable filtering of the historical UE context.

The diagram 900 of FIG. 9 describes an extension of the reverse engineered propagation model 730 of FIG. 7. As illustrated in the diagram 900, the updated propagation model 930 obtains measurements 910. The measurements 910 can be associated with a UE and used to identify a pseudo location 940. The measurements 710 can be from reports of the UE such as an RRC measurement report and CSI. The measurements can include RSRPs (and RSRQs and SINRs per configuration chosen by the eNB/gNB), beam IDs (from the serving cell and a number of neighboring cells), and the like.

In certain embodiments, the updated propagation model 930 is an updated version of the reverse engineered propagation model 730 of FIG. 7. The updated propagation model 930 can be re-trained offline. Selectively obtained MDT data (such as RSRPs, Beam IDs, and UE location data) can be used for the retraining. The identified UE pseudo location 940 can be in cartesian or polar coordinates relative to the gNB.

Flowchart 1000 describes a procedure to re-train the reverse engineered propagation model 730 of FIG. 7 in order to create the updated propagation model 930 of FIG. 9. For example, in step 1002, the gNB configures the UE with suitable periodic measurements. In certain embodiments, the gNB configures the UE with suitable periodic measurements using SON/MDT. In step 1004, the gNB provide the measurements to the retraining mechanism that is used to retrain the reverse engineered propagation model 730 of FIG. 7. In step 1006, the gNB makes the newly re-trained AI model operational. That is, the updated propagation model 930 replaces the reverse engineered propagation model 730. In certain embodiments, the gNB determines whether the updated propagation model 930 performs within a threshold level. If the updated propagation model 930 performs below the threshold then the reverse engineered propagation model 730 remains operational. If the updated propagation model 930 performs at or above the threshold then the updated propagation model 930 replaces the reverse engineered propagation model 730.

The flowchart 1050 of FIG. 10B describes a procedure of using the updated artificial neural network in real-time operations. It is noted that the flowchart 1050 is similar to the flowchart 850 of FIG. 8B.

In step 1052, the gNB configures the UE with periodic measurements, such as RSRP, and beam IDs of the stronger number of cells that meet a predefined threshold criterion. In step 1054, the gNB predicts the pseudo location of the UE using the updated AI model 930. In step 1056, the gNB estimates the speed of the UE (such as miles per hour, meters per second, and the like) and the direction of travel (such as East, North-East, North-North-East, and the like). The gNB estimates the speed of the UE and the direction of travel using any suitable filtering of the historical UE context.

In certain embodiments, the signal measurements (e.g., RSRP, RSRQ, and SINR) of one or more beams in the serving cell and 0 or more neighbor cells are used as inputs to the AI propagation model. In certain embodiments, measurements such as RSRQ, SINR, and timing differences between the cells can also be used as inputs to the AI propagation model.

In certain embodiments, historical measurements such as the drive-test data can be directly used without relying on a tuned propagation model from an NPDT to train an AI-based model or a non-AI-based model to estimate the UE location. A tuned or non-tuned propagation model can be used to create the data for the training, validation, and testing.

In certain embodiments, the AI model is updated regularly at certain intervals using the measurements and the UE location reported by the SON feature of MDT based on a configurable threshold. For example, the AI model is updated every 6 months. It is noted that the observed accuracy can also be used to how often the AI model should be updated.

In certain embodiments, the updated AI propagation model is provided to the NPDT for more accurate analysis to guide future network design and/or network optimization efforts.

In certain embodiments, the AI model can be operated in an open loop mode. In an option loop mode, an operator decides whether to use the updated model or not. In another embodiment, the AI model can be operated in a closed loop mode. In a closed loop mode, the AI model itself decides to make the changes. For example, the AI model may evaluate its own performance and make the performance results available to other entities (such as a service provider).

In certain embodiments, the network uses the UE context to determine when to activate MDT for a given UE in a given cell. For example, if the UE is in a location where signal measurements are desired, the Immediate Mode of MDT can be exploited by the gNB using RRC signaling. For instance, the gNB sends the RRC Reconfiguration message to configure a UE with MDT measurements. The UE sends the Measurement Report to convey the signal measurements to the network.

In certain embodiments, the MDT measurements are used to tune the propagation model (e.g., by retraining an AI propagation model). In some embodiments, such updated AI propagation model is provided to the NPDT to enhance the accuracy of NPDT predictions.

Although FIGS. 7, 8A, 8B, 9, 10A, and 10B illustrate examples of localizing a UE using an artificial intelligence model, various changes can be made to FIGS. 7-10B. For example, while shown as a series of steps, various steps in FIGS. 8A, 8B, 10A, and 10B could overlap, occur in parallel, or occur any number of times.

FIGS. 11A, 11B, 11C, and 11D illustrate example diagrams 1100 and 1150, and tables 1160 and 1170 for triggering a handover based on UE context according to various embodiments of this disclosure. The diagrams 1100 and 1150 and tables 1160 and 1170 can be performed by any of the eNBs (such as the BS 102) or the server 400 of FIGS. 1, 2, and 4. The embodiment shown in FIGS. 11A, 11B, 11C, and 11D are for illustration only. Other embodiments are used without departing from the scope of the present disclosure.

The diagram 1100 describes an open radio access network (ORAN) configuration. A distributed unit (DU) collects UE information 1102. The UE information 1102 can include beam ID, data packet header, and L1-RSRP etc. The UE information 1102 can be periodically transmitted from the UE to the DU.

The DU reports 1112 the UE information 1102 to a near real-time server at certain time intervals. In certain embodiments, the DU reports 1112 the UE information 1102 to a near-real-time server every 10 ms.

After the near-real-time server receives the report 1112 from the DU, the near-real-time server reports 1123 the measurement information to a non-real time server. In certain embodiments, the non-rear real-time server is a non-real-time RIC server.

After the non-real time server receives the report 1123, the non-real time server collects a set of user measurement data for the UE and then generates enriched information. The enriched information includes location of the UE, the speed of the UE, the direction of travel of the UE, and various QoS related information for EPS Bearers and 5G QoS Flows (representing applications such such as VoLTE, gaming, FTP, and the like). The non-real time server then reports 1132 the enriched information to the near-real time server. The near-real time server generates mobility management configuration (e.g., handover parameters) using the enriched information. The handover parameters can include time-to-trigger, neighbor cell list and various other thresholds. The near-real time server then reports 1124 the generated handover parameters to the DU. The DU then generates an RRC configuration message and transmits it to the UE.

The diagram 1150 describes how the non-real-time server generates the enriched information. The non-real-time server first divides the whole 5G cell into N cell grids. The non-real-time server can divide the cell into N cell grids based on the azimuth angle to the base station and the cell radius. The non-real-time server normalizes the received RSRPs. Thereafter, in block 1152, the non-real-time server inputs beam IDs and the normalized RSRPs into an offline trained deep neural network (block 1153), such as the reversed engineered propagation model 730 of FIG. 7. The offline trained deep neural network generates a cell grid categorization, 1154, with UE locations. The non-real-time server in block 1156 categorizes the speed of the UE. The speed of the UE can be distinguished based on various thresholds as described in Equation (3). The thresholds as described in Equation (3) can distinguish between the speed classes such as a slow speed, a medium speed, and a fast speed. The speed can be estimated using cell grids. For example, speed can be calculated as (distance between two cell grids)/(time taken by the UE to travel between two cell grids). The distance between the two cell grids can be calculated as the distance between the centers of two cell grids. The non-real-time server in block 1158 categorizes the UE as entering or leaving a cell, as described in Equation (4). That is, the non-real-time server categorizes the UE as either leaving from a cell or coming to a cell.

$$\begin{cases} \text{low speed,} & \text{if } v < v_1 \\ \text{medium speed} & \text{if } v_1 < v < v_2 \\ \text{fast speed,} & \text{if } v > v_2 \end{cases} \quad \text{Equation (3)}$$

$$\begin{cases} \text{departing, if } g(t_n) \text{ is not edge grid, } g(t_n) \text{ is edge trid} \\ \text{comming, if } g(t_n) \text{ is edge grid, } g(t_n) \text{ is not edge grid} \end{cases} \quad \text{Equation (4)}$$

The tables 1160 and 1170 as shown in FIGS. 11C and 11D, respectively, describes various configurations that the near-real-time server can implement for configuring handover parameters based on the categorized speed classes of the UE. The table 1160 describes generalized configurations that the near-real-time server can implement for configuring handover parameters based on the categorized speed classes of the UE, while the table 1170 describes specific exemplary values for the configuring handover parameters based on the categorized speed classes of the UE. It is noted that the numerical values as shown in the table 1170 as examples only as the exact numerical values are implementation-dependent. For example, the near-real-time server can fetch UE enrichment information including location/grid information, speed information (high/low/medium, leaving/coming), application information (VoLTE/Gaming, Data/FTP) from the non-real-time server.

In certain embodiments, the near-real-time server finds the proper handover parameter configurations according to the fetched enrichment information. For example, the near-real-time server can use the table 1160 to configure the proper handover parameters based on the identified speed class of the UE.

In certain embodiments, the near-real-time server sends the handover configuration information including TTT/A3 threshold and measurement report period to a distributive unit. Thereafter, the distributive unit use RRC configuration message to configure UE handover behavior.

Figure 11A:
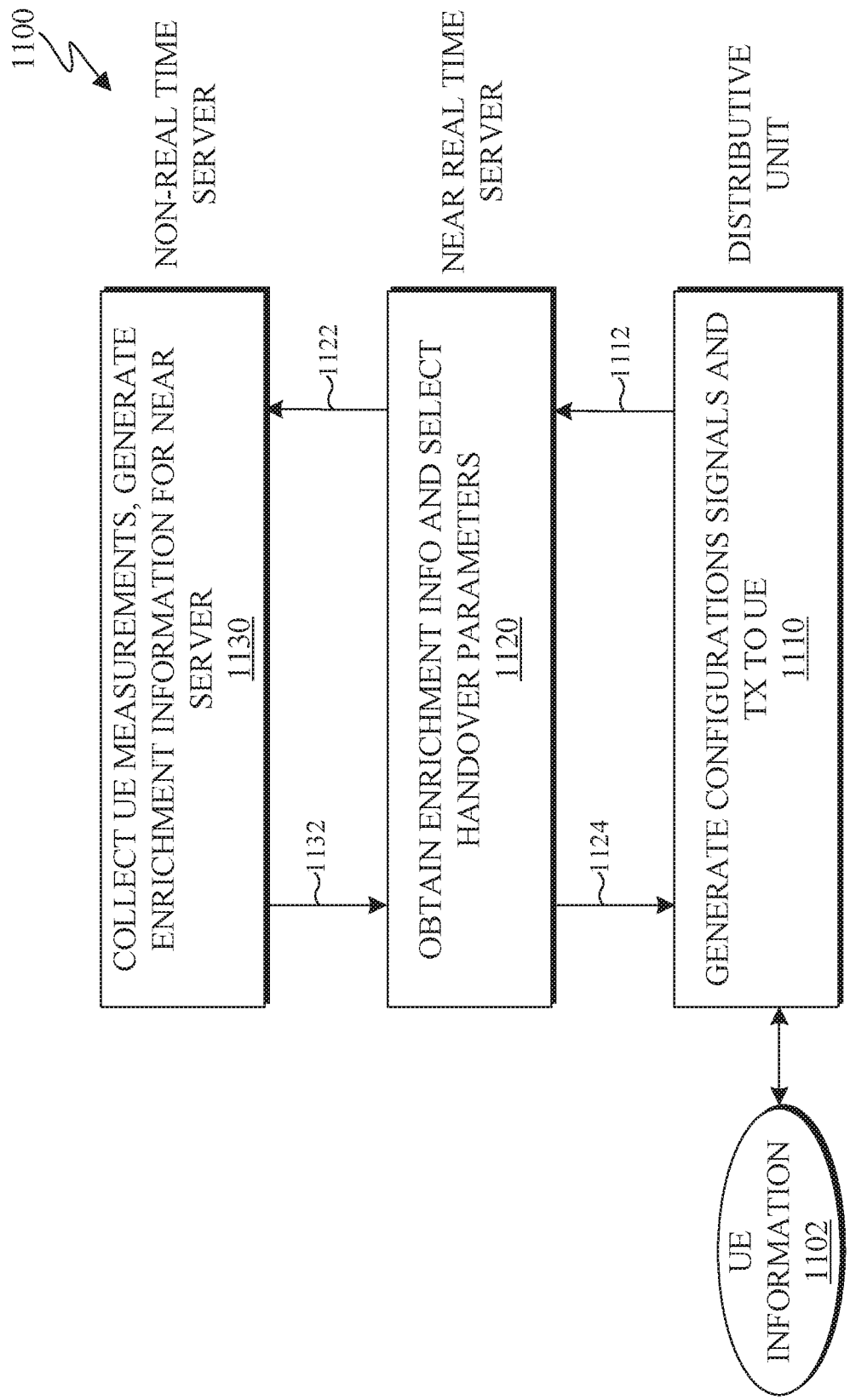
Figure 11B:
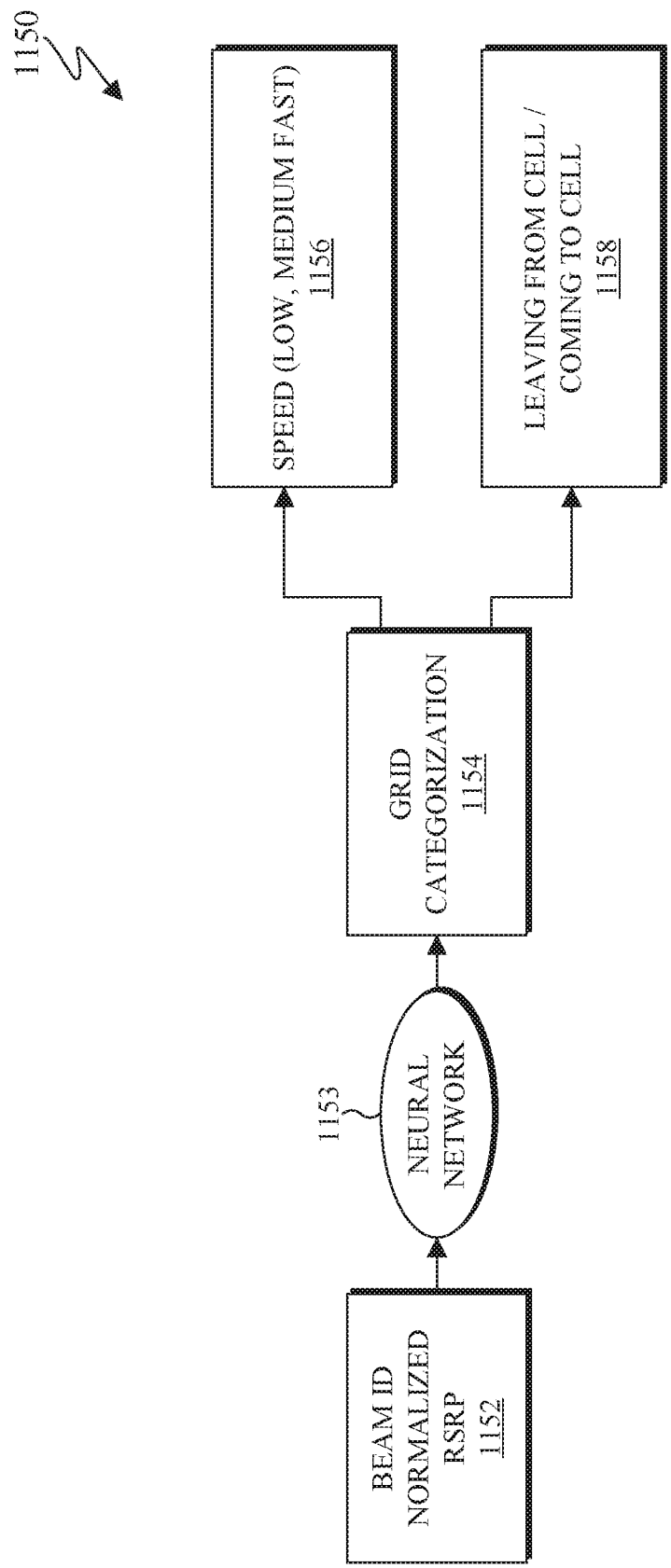

Although FIGS. 11A, 11B, 11C, and 11D illustrates examples of an open radio access network configuration, various changes can be made to FIGS. 11A, 11B, 11C, and 11D. For example, various components as shown in FIG. 11A could be combined. For another example additional components can be added to FIG. 11A.

Figure 12:
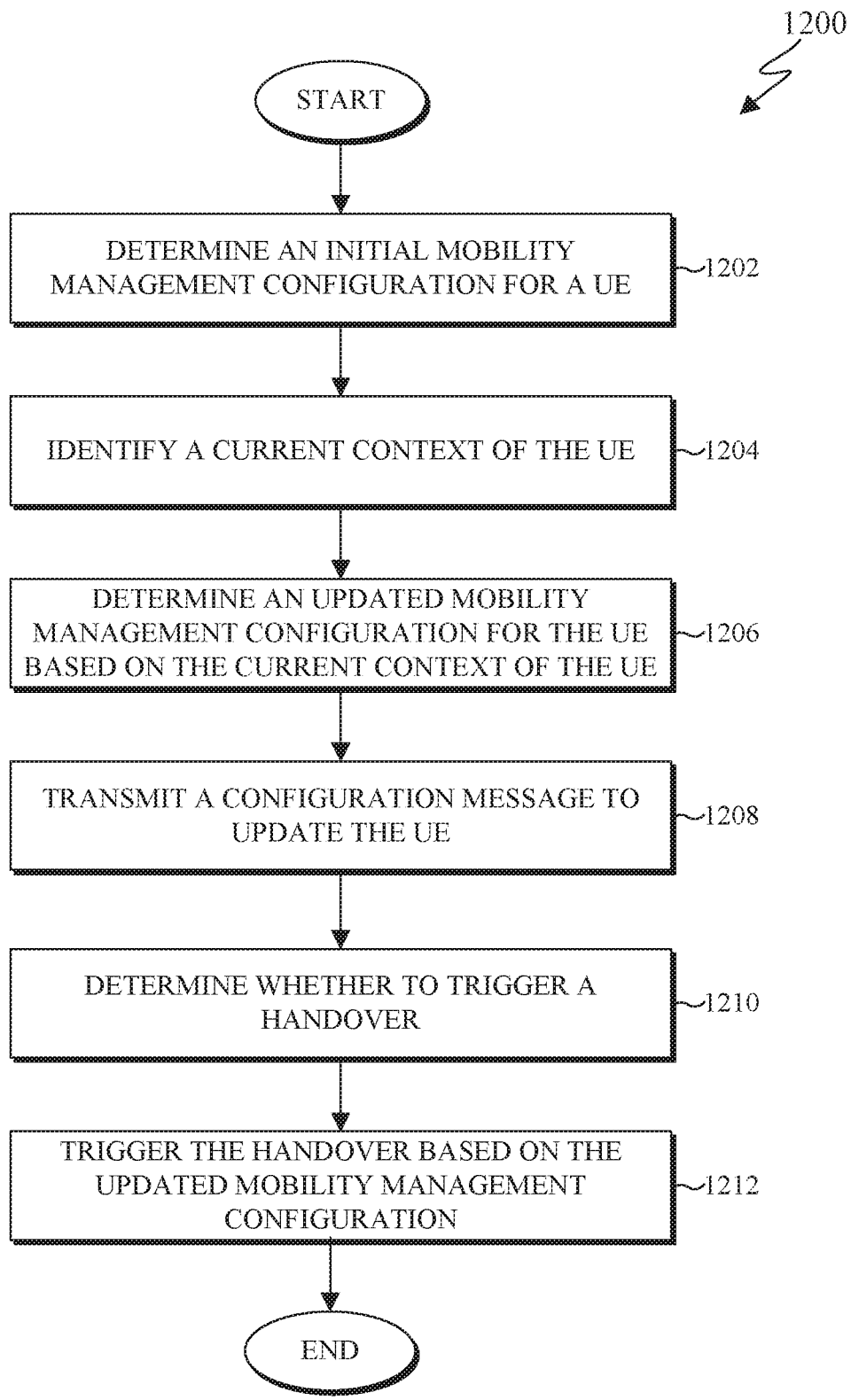
FIG. 12 illustrates a process for managing a network entity in accordance with an embodiment of this disclosure.

FIG. 12 illustrates a process 1200 for managing a network entity in accordance with an embodiment of this disclosure. The process 1200 can be performed by any of the eNBs of FIG. 1, the eNB 102 of FIG. 2, and the server 400 of FIGURE and 4. For ease of explanation, the process 1200 is described as being performed by a network entity that includes the mobility management engine 530 of FIG. 5, the reverse engineered propagation model 730 of FIG. 7, and the updated propagation model 930 of FIG. 9. The embodiments of FIG. 12 are for illustration only. Other embodiments can be used without departing from the scope of this disclosure In step 1202, the network entity determines an initial mobility management configuration for a UE in a serving cell. To determine the initial mobility management configuration, the network entity can determine the initial mobility management configuration when a signaling connection between the UE and a network entity is initially established. Alternatively, the network entity can determine the initial mobility management configuration when a signaling connection between the UE and a network entity is reestablished.

The initial or default mobility management configuration for a UE can be based on cell configuration information. The cell configuration information includes information indicating a size and a deployment type of the serving cell and an estimated mobility profile of the UE within the serving cell. The deployment type of the serving cell can indicate whether the serving cell is located in an urban area, a rural area, and the like. The deployment may further point to a low-band, mid-band, or high-band (e.g., mMW) deployment. Furthermore, the deployment may include the network architecture option such as Standalone NR with the NGC (so-called Option 2) and Non-Standalone NR with the EPC (i.e., EN-DC or Option 3x).

In certain embodiments, the initial mobility management configuration for the UE includes a white list of cells for performing a handover. The initial mobility management configuration for the UE can also include measurement reporting configurations including at least one of thresholds, offsets, hysteresis values, time-to-trigger values, and periodicity of reports.

In step 1204, the network entity identifies a current context of the UE. The current context of the UE can be based on reports received from the UE. The current context for the UE includes information indicating at least one of a location of the UE, a movement direction of the UE, a movement speed of the UE, and a quality of service (QoS) metric for communications of the UE.

To identify the current context of the UE, the network entity identifies, based on the reports received from the UE, a beam ID and a signal metric for one or more beams used for communication with the UE in the serving cell, The signal metric includes at least one of RSRP, RSRQ, and SINR. The network entity can also identify, based on the reports received from the UE, beam IDs and associated signal metrics for one or more beams of one or more neighboring cells. The network entity can determine a location of the UE, relative to a center of the serving cell, based on the beam IDs and the associated signal metrics of the serving cell. In certain embodiments, the network entity can determine a location of the UE, relative to a center of the serving cell, based on the beam IDs and the associated signal metrics of the serving cell and the one or more neighboring cells.

In certain embodiments, in order to identify the current context of the UE, the network entity can identify, based on the reports from the UE, beam IDs and associated signal metrics for one or more beams of the serving cell. The network entity can transmit to a non-real time server the identified beam IDs and the associated signal strength metrics. Thereafter, the network entity can receive, from the non-real time server, information indicating a location of the UE, a movement direction of the UE, and a movement speed of the UE.

In certain embodiments, an artificial intelligence model, such as a neural network is used to identify the current context of the UE. In order use an artificial intelligence model to identify the current context of the UE, the artificial intelligence model is trained. A previously trained artificial intelligence model can be updated using new data that is obtained by SON and/or MDT measurements.

To identify the current context of the UE using a trained artificial intelligence model, the network entity can identify, based on the reports received from the UE, beam IDs and associated signal metrics for one or more beams of the serving cell and one or more neighbor cells. The network entity then determines a location of the UE based on the beam IDs and the associated signal metrics using the trained artificial intelligence model. In some embodiments, the network entity can also process historical context of the UE to identify a movement direction of the UE and a movement speed of the UE with respect to the location of the UE.

In step 1206, the network entity determines an updated mobility management configuration for the UE based on the current context of the UE. In certain embodiments, the updated mobility management configuration can include a modification to one or more of the white list cells. The updated mobility management configuration can also include the measurement reporting configurations in the initial mobility management configuration to modify mobility management of the UE based on the current context of the UE. In certain embodiments, to determine the updated mobility management configuration, the network entity can select a mobility management configuration including handover parameters, associated with the handover, for the updated mobility management configuration based on the current context for the UE.

In certain embodiments, the updated mobility management configuration indicates a type of RA procedure during a handover based on a QoS metric. The RA procedure is a four-step RA procedure or two-step RA procedure. In certain embodiments, the updated mobility management configuration indicates whether to use a DAPS feature during the handover based on the QoS metric. In certain embodiments, the updated mobility management configuration indicates whether to configure the UE to make use of dual connectivity based on the QoS metric and the type of the device (e.g., an IoT device vs. a smartphone).

In certain embodiments, the network entity determines whether to activate at least one of SON/MDT measurements for the UE, based on the current context of the UE. For example, the current context of the UE is used by the network entity to determine whether to activate or deactivate the SON or MDT measurements for the UE.

To determine an updated mobility management configuration for the UE, the network entity can identify a current value for network efficiency for the initial mobility management configuration based on performance metrics for the network efficiency. Thereafter, the network entity generates estimated values for the network efficiency by analyzing candidate mobility management configurations based on the current context of the UE. The network entity then determines to update the initial mobility management configuration based on a comparison of the current value for the network efficiency corresponding to the initial mobility management configuration with a new value for network efficiency corresponding to a newly selected mobility management configuration. That is, the network entity changes various candidate mobility configurations and identifies which candidate configuration maximizes an objective function based on the current context of the UE.

In step 1208, the network entity transmits a configuration message to update the UE with the updated mobility management configuration. In step 1210, the network entity determines whether to trigger a handover of the UE based on comparison of the serving cell and neighbor cell measurements with thresholds. In step 1212 the network entity triggers a handover based on the updated mobility management configuration.

Although the figures illustrate different examples of user equipment, various changes may be made to the figures. For example, the user equipment can include any number of each component in any suitable arrangement. In general, the figures do not limit the scope of this disclosure to any particular configuration(s). Moreover, while figures illustrate operational environments in which various user equipment features disclosed in this patent document can be used, these features can be used in any other suitable system.

None of the description in this application should be read as implying that any particular element, step, or function is an essential element that must be included in the claim scope. The scope of patented subject matter is defined by the claims. Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A network entity for managing mobility in a wireless communication system, the network entity comprising:
   a transceiver; and
   a processor operably coupled to the transceiver, wherein the processor is configured to:
   determine an initial mobility management configuration for a user equipment (UE) in a serving cell when a signaling connection between the UE and the network entity is initially established, wherein the initial mobility management configuration is based on cell configuration information of the serving cell;
   identify a current context of the UE based on reports received from the UE;
   determine an updated mobility management configuration for the UE based on the current context of the UE and a tradeoff between a signaling load and a handover delay;
   transmit a configuration message to update the UE with the updated mobility management configuration;
   determine whether to trigger a handover of the UE based on comparison of the serving cell and neighbor cell measurements with thresholds; and
   trigger the handover based on the updated mobility management configuration.

2. The network entity of claim 1, wherein:
   the cell configuration information includes information indicating a size and a deployment type of the serving cell and an estimated mobility profile of the UE within the serving cell; and
   to determine the initial mobility management configuration, the processor is configured to determine the initial mobility management configuration when a signaling connection between the UE and the network entity is initially established or reestablished.

3. The network entity of claim 1, wherein:
the initial mobility management configuration for the UE includes a white list of cells for performing the handover to and measurement reporting configurations including at least one of thresholds, offsets, hysteresis values, time-to-trigger values, and periodicity of reports; and
the updated mobility management configuration includes a modification to one or more of the white list and the measurement reporting configurations in the initial mobility management configuration to modify mobility management of the UE based on the current context of the UE.

4. The network entity of claim 1, wherein:
the current context for the UE includes information indicating at least one of a location of the UE, a movement direction of the UE, a movement speed of the UE, and a quality of service (QoS) metric for communications of the UE; and
the processor is further configured to determine whether to activate at least one of a Self-Organizing Network (SON) and Minimization of Drive Tests (MDT) measurements for the UE, based on the current context of the UE.

5. The network entity of claim 1, wherein to determine the updated mobility management configuration for the UE, the processor is configured to:
determine a type of random access (RA) procedure during the handover based on a QoS metric, wherein the RA procedure is a four-step RA procedure or a two-step RA procedure;
determine whether to use a Dual Active Protocol Stack feature during the handover based on the QoS metric; and
determine whether to configure the UE to make use of dual connectivity based on the QoS metric.

6. The network entity of claim 1, wherein:
to identify the current context of the UE, the processor is configured to:
identify, based on the reports received from the UE, a beam ID and a signal metric for one or more beams in the serving cell, wherein the signal metric includes at least one of RSRP, RSRQ, and SINK, and
identify, based on the reports received from the UE, beam IDs and associated signal metrics for one or more beams of one or more neighboring cells; and
the processor is further configured to determine a location of the UE, relative to a center of the serving cell, based on the beam IDs and the associated signal metrics of the serving cell and the one or more neighboring cells, wherein the current context of the UE includes the determined location of the UE.

7. The network entity of claim 1, wherein the processor is further configured to:
collect a UE measurement reports including beam IDs and signal metrics for the serving cell and neighbor cells;
generate auxiliary enrichment information of a cell grid location based on the UE measurements reports;
categorize the UE into a speed class based on the auxiliary enrichment information;
determine whether the UE is entering the serving cell based on the auxiliary enrichment information; and
determine the updated mobility management configuration that specifies handover parameters based on the current context of the UE includes the auxiliary enrichment information, the categorized speed class, and whether the UE is entering the serving cell, wherein the handover parameters include at least one of thresholds, offsets, hysteresis values, time-to-trigger values, and periodicity of reports.

8. The network entity of claim 1, wherein:
the processor is further configured to train an artificial intelligence model based on location based signal metric data;
wherein to identify the current context of the UE, the processor is configured to:
identify, based on the reports received from the UE, beam IDs and associated signal metrics for one or more beams of the serving cell and one or more beams of one or more neighbor cells,
determine a location of the UE based on the beam IDs and the associated signal metrics using the trained artificial intelligence model, and
process historical context of the UE for identifying a movement direction of the UE and a movement speed of the UE with respect to the location of the UE; and
the current context of the UE includes the location of the UE, the movement direction of the UE, the movement speed of the UE.

9. The network entity of claim 1, wherein:
to identify the current context of the UE, the processor is configured to:
identify, based on the reports received from the UE, beam IDs and associated signal metrics for one or more beams of the serving cell and one or more beams of one or more neighbor cells,
transmit to a non-real time server the identified beam IDs and the associated signal metrics for the one or more beams of the serving cell and the one or more neighbor cells,
receive, from the non-real time server, information indicating a location of the UE, a movement direction of the UE, and a movement speed of the UE, and
identify the current context for the UE based on the received information; and
to determine the updated mobility management configuration, the processor is further configured to select a mobility management configuration including handover parameters, associated with the handover, for the updated mobility management configuration based on the current context for the UE.

10. The network entity of claim 1, wherein the processor is further configured to:
identify a current value for network efficiency corresponding to the initial mobility management configuration;
generate estimated values for the network efficiency by analyzing candidate mobility management configurations based on the current context of the UE; and
determine to update the initial mobility management configuration based on a comparison of (i) the current value for the network efficiency corresponding to the initial mobility management configuration with (ii) a new value for network efficiency corresponding to a newly selected mobility management configuration; and
update the mobility management configuration with the newly selected mobility management configuration.

11. A method for managing mobility in a wireless communication system, the method comprising:
determining an initial mobility management configuration for a user equipment (UE) in a serving cell when a signaling connection between the UE and a network entity is initially established, wherein the initial mobility management configuration is based on cell configuration information of the serving cell;
identifying a current context of the UE based on reports received from the UE;
determining an updated mobility management configuration for the UE based on the current context of the UE and a tradeoff between a signaling load and a handover delay;
transmitting a configuration message to update the UE with the updated mobility management configuration;
determining whether to trigger a handover of the UE based on comparison of the serving cell and neighbor cell measurements with thresholds; and
triggering the handover based on the updated mobility management configuration.

12. The method of claim 11, wherein:
the cell configuration information includes information indicating a size and a deployment type of the serving cell and an estimated mobility profile of the UE within the serving cell; and
determining the initial mobility management configuration comprises determining the initial mobility management configuration when a signaling connection between the UE and a network entity is initially established or reestablished.

13. The method of claim 11, wherein:
the initial mobility management configuration for the UE includes a white list of cells for performing the handover to and measurement reporting configurations including at least one of thresholds, offsets, hysteresis values, time-to-trigger values, and periodicity of reports; and
the updated mobility management configuration includes a modification to one or more of the white list and the measurement reporting configurations in the initial mobility management configuration to modify mobility management of the UE based on the current context of the UE.

14. The method of claim 11, wherein:
the current context for the UE includes information indicating at least one of a location of the UE, a movement direction of the UE, a movement speed of the UE, and a quality of service (QoS) metric for communications of the UE; and
the method further comprises determining, whether to activate at least one of a Self-Organizing Network (SON) and Minimization of Drive Tests (MDT) measurements for the UE, based on the current context of the UE.

15. The method of claim 11, wherein determining the updated mobility management configuration for the UE comprises:
determining a type of random access (RA) procedure during the handover based on a QoS metric, wherein the RA procedure is a four-step RA procedure, or a two-step RA procedure;
determining whether to use a Dual Active Protocol Stack feature during the handover based on the QoS metric; and
determining whether to configure the UE to make use of dual connectivity based on the QoS metric.

16. The method of claim 11, wherein:
identifying the current context of the UE comprises:
identifying, based on the reports received from the UE, a beam ID and a signal metric for one or more beams in the serving cell, wherein the signal metric includes at least one of RSRP, RSRQ, and SINK, and
identifying, based on the reports received from the UE, beam IDs and associated signal metrics for one or more beams of one or more neighboring cells; and
determining a location of the UE, relative to a center of the serving cell, based on the beam IDs and the associated signal metrics of the serving cell and the one or more neighboring cells, wherein the current context of the UE includes the determined location of the UE.

17. The method of claim 11, further comprising:
collecting a UE measurement reports including beam IDs and signal metrics for the serving cell and neighbor cells;
generating auxiliary enrichment information of a cell grid location based on the UE measurements reports;
categorizing the UE into a speed class based on the auxiliary enrichment information;
determining whether the UE is entering the serving cell based on the auxiliary enrichment information; and
determining the updated mobility management configuration that specifies handover parameters based on the current context of the UE includes the auxiliary enrichment information, the categorized speed class, and whether the UE is entering the serving cell, wherein the handover parameters include at least one of thresholds, offsets, hysteresis values, time-to-trigger values, and periodicity of reports.

18. The method of claim 11, further comprising:
training an artificial intelligence model based on location based signal metric data;
wherein identifying the current context of the UE comprises:
identifying, based on the reports received from the UE, beam IDs and associated signal metrics for one or more beams of the serving cell and one or more beams of one or more neighbor cells,
determining a location of the UE based on the beam IDs and the associated signal metrics using the trained artificial intelligence model, and
processing historical context of the UE for identifying a movement direction of the UE and a movement speed of the UE with respect to the location of the UE, and
wherein the current context of the UE includes the location of the UE, the movement direction of the UE, the movement speed of the UE.

19. The method of claim 11, wherein:
identifying the current context of the UE comprises:
identifying, based on the reports received from the UE, beam IDs and associated signal metrics for one or more beams of the serving cell and one or more beams of one or more neighbor cells,
transmitting to a non-real time server the identified beam IDs and the associated signal metrics for the one or more beams of the serving cell and the one or more neighbor cells,
receiving, from the non-real time server, information indicating a location of the UE, a movement direction of the UE, and a movement speed of the UE, and
identifying the current context for the UE based on the received information; and
determining the updated mobility management configuration comprises selecting a mobility management configuration including handover parameters, associated with the handover, for the updated mobility management configuration based on the current context for the UE.

20. The method of claim 11, further comprising:

identifying a current value for network efficiency corresponding to the initial mobility management configuration;

generating estimated values for the network efficiency by analyzing candidate mobility management configurations based on the current context of the UE;

determining to update the mobility management configuration based on a comparison of (i) the current value for the network efficiency corresponding to the initial mobility management configuration with (ii) a new value for network efficiency corresponding to a newly selected mobility management configuration; and updating the mobility management configuration with the newly selected mobility management configuration.

* * * * *